(12) United States Patent
Lee et al.

(10) Patent No.: US 12,545,937 B2
(45) Date of Patent: Feb. 10, 2026

(54) ISOPROPYLMALATE SYNTHASE VARIANT AND A METHOD OF PRODUCING L-LEUCINE USING THE SAME

(71) Applicant: CJ CHEILJEDANG CORPORATION, Seoul (KR)

(72) Inventors: Hayun Lee, Seoul (KR); Ju Eun Kim, Seoul (KR); Ji Hye Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 339 days.

(21) Appl. No.: 18/274,912

(22) PCT Filed: Jan. 28, 2022

(86) PCT No.: PCT/KR2022/001560
§ 371 (c)(1),
(2) Date: Jul. 28, 2023

(87) PCT Pub. No.: WO2022/186487
PCT Pub. Date: Sep. 9, 2022

(65) Prior Publication Data
US 2024/0093252 A1    Mar. 21, 2024

(30) Foreign Application Priority Data

Mar. 5, 2021 (KR) .................. 10-2021-0029469

(51) Int. Cl.
| C12P 13/06 | (2006.01) |
| C12N 9/10  | (2006.01) |
| C12N 15/77 | (2006.01) |
| C12R 1/15  | (2006.01) |

(52) U.S. Cl.
CPC ............ *C12P 13/06* (2013.01); *C12N 9/1025* (2013.01); *C12N 15/77* (2013.01); *C12R 2001/15* (2021.05); *C12Y 203/03013* (2013.01)

(58) Field of Classification Search
CPC ....... C12P 13/06; C12N 9/1025; C12N 15/77; C12R 2001/15; C12Y 203/03013
See application file for complete search history.

(56) References Cited

U.S. PATENT DOCUMENTS

| 6,403,342 B1 | 6/2002 | Gusyatiner et al. |
| 7,662,943 B2 | 2/2010 | Park et al. |
| 10,273,491 B2 | 4/2019 | Lee et al. |
| 10,584,338 B2 | 3/2020 | Lee et al. |
| 2015/0079641 A1 | 3/2015 | Gerstmeir et al. |
| 2021/0189354 A1 | 6/2021 | Zhang et al. |
| 2021/0254111 A1 | 8/2021 | Lee et al. |

FOREIGN PATENT DOCUMENTS

| EP | 1 067 191 A2 | 1/2001 |
| EP | 1568776 A2 | 8/2005 |
| EP | 2841568 A1 | 3/2015 |
| EP | 3 564 366 A2 | 11/2019 |
| EP | 4155395 A1 | 3/2023 |
| JP | 2015-514431 A | 5/2015 |
| JP | 2020-503045 A | 1/2020 |
| KR | 10-0220018 B1 | 10/1999 |
| KR | 10-0438146 B1 | 11/2004 |
| KR | 10-2014-0067082 A | 6/2014 |
| KR | 10-2018-0077008 A | 7/2018 |

OTHER PUBLICATIONS

Office Action issued in corresponding Japanese Patent Application No. 2023-540849, dated Jul. 30, 2024.
Extended European Search Report in corresponding European Patent Application No. 22763472.2, dated May 24, 2024.
Vogt et al., "Pushing product formation to its limit: Metabolic engineering of Corynebacterium glutamicum for l-leucine overproduction", Metabolic Engineering, vol. 22, No. 1, Mar. 2014, pp. 40-52, XP055111480.
Kohlhaw, "Leucine Biosynthesis in Fungi: Entering Metabolism through the Back Door," Microbiology and Molecular Biology Reviews, 67(1): 1-15 (2003).
International Search Report issued in corresponding International Patent Application No. PCT/KR2022/001560 dated May 16, 2022.
Office Action issued in corresponding Brazilian Patent Application No. BR112023015182-1, dated Oct. 1, 2024.

*Primary Examiner* — Manjunath N Rao
*Assistant Examiner* — Olga B Soto
(74) *Attorney, Agent, or Firm* — Morgan, Lewis & Bockius LLP

(57) ABSTRACT

The present disclosure relates to an isopropylmalate synthase variant and a method of producing L-leucine using the same.

15 Claims, No Drawings
Specification includes a Sequence Listing.

SEQUENCE LISTING

```
<160> NUMBER OF SEQ ID NOS: 55

<210> SEQ ID NO 1
<211> LENGTH: 616
<212> TYPE: PRT
<213> ORGANISM: Unknown
<220> FEATURE:
<223> OTHER INFORMATION: leuA(616 aa)

<400> SEQUENCE: 1
```

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
            35                  40                  45

Glu Asp Ile Ser Leu Pro Asp Arg Thr Trp Pro Asp Lys Lys Ile Thr
        50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
            115                 120                 125

Ile Pro Asp Asp Val Thr Ile Gln Val Leu Val Gln Ala Arg Glu His
        130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
            165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Ser Pro Glu Ser Phe Thr Gly Thr Glu Val Glu Tyr Ala Lys
        210                 215                 220

Glu Val Val Asp Ala Val Val Glu Val Met Asp Pro Thr Pro Glu Asn
225                 230                 235                 240

Pro Met Ile Ile Asn Leu Pro Ser Thr Val Glu Met Ile Thr Pro Asn
            245                 250                 255

Val Tyr Ala Asp Ser Ile Glu Trp Met His Arg Asn Leu Asn Arg Arg
            260                 265                 270

Asp Ser Ile Ile Leu Ser Leu His Pro His Asn Asp Arg Gly Thr Gly
        275                 280                 285

Val Gly Ala Ala Glu Leu Gly Tyr Met Ala Gly Ala Asp Arg Ile Glu
        290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
            325                 330                 335

Phe Thr Asp Ile Arg Gln Ile Arg Ser Thr Val Glu Tyr Cys Asn Gln
            340                 345                 350

Leu Arg Val Pro Glu Arg His Pro Tyr Gly Gly Asp Leu Val Phe Thr
            355                 360                 365

Ala Phe Ser Gly Ser His Gln Asp Ala Val Asn Lys Gly Leu Asp Ala
            370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
            405                 410                 415

Pro Lys Asp Val Gly Arg Asp Tyr Glu Ala Val Ile Arg Val Asn Ser
```

```
            420             425             430
Gln Ser Gly Lys Gly Val Ala Tyr Ile Met Lys Thr Asp His Gly
    435                 440                 445

Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
            500                 505                 510

Ile Thr Ala Glu Leu Ile His Asn Gly Lys Asp Val Thr Val Asp Gly
            515                 520                 525

Arg Gly Asn Gly Pro Leu Ala Ala Tyr Ala Asn Ala Leu Glu Lys Leu
        530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
                580                 585                 590

Leu Lys Ala Val Thr Ser Ala Val Asn Arg Ala Leu Asp Val Asn His
        595                 600                 605

Glu Ala Val Leu Ala Gly Gly Val
    610                 615

<210> SEQ ID NO 2
<211> LENGTH: 1851
<212> TYPE: DNA
<213> ORGANISM: Unknown
<220> FEATURE:
<223> OTHER INFORMATION: leuA WT(1851 bp)

<400> SEQUENCE: 2
atgtctccta cgatgcatt catctccgca cctgccaaga tcgaaacccc agttgggcct      60
cgcaacgaag ccagccagc atggaataag cagcgtggct cctcaatgcc agttaaccgc     120
tacatgcctt tcgaggttga ggtagaagat atttctctgc ggaccgcac ttggccagat     180 aaaaaaatca ccgttgcacc tcagtggtgt gctgttgacc tgcgtgacgg caaccaggct    240
ctgattgatc cgatgtctcc tgagcgtaag cgccgcatgt ttgagctgct ggttcagatg    300
ggcttcaaag aaatcgaggt cggtttccct tcagcttccc agactgattt tgatttcgtt    360
cgtgagatca tcgaaaaggg catgatccct gacgatgtca ccattcaggt tctggttcag    420
gctcgtgagc acctgattcg ccgtactttt gaagcttgcg aaggcgcaaa aaacgttatc    480
gtgcacttct acaactccac ctccatcctg cagcgcaacg tggtgttccg catggacaag    540
gtgcaggtga agaagctggc taccgatgcc gctgaactaa tcaagaccat cgctcaggat    600
tacccagaca ccaactggcg ctggcagtac tcccctgagt ccttcaccgg cactgaggtt    660
gagtacgcca aggaagttgt ggacgcagtt gttgaggtca tggatccaac tcctgagaac    720
ccaatgatca tcaacctgcc ttccaccgtt gagatgatca cccctaacgt ttacgcagac    780
tccattgaat ggatgcaccg caatctaaac cgtcgtgatt ccattatcct gtccctgcac    840
ccgcacaatg accgtggcac cggcgttggc cagctgagc tgggctacat ggctggcgct    900
gaccgcatcg aaggctgcct gttcggcaac ggcgagcgca ccggcaacgt ctgcctggtc    960
```

```
accctggcac tgaacatgct gacccagggc gttgaccctc agctggactt caccgatata   1020
cgccagatcc gcagcaccgt tgaatactgc aaccagctgc gcgttcctga gcgccaccca   1080
tacggcggtg acctggtctt caccgctttc tccggttccc accaggacgc tgtgaacaag   1140
ggtctggacg ccatggctgc caaggttcag ccaggtgcta gctccactga agtttcttgg   1200
gagcagctgc gcgacaccga atgggaggtt ccttacctgc ctatcgatcc aaaggatgtc   1260
ggtcgcgact acgaggctgt tatccgcgtg aactcccagt ccggcaaggg cggcgttgct   1320
tacatcatga agaccgatca cggtctgcag atccctcgct ccatgcaggt tgagttctcc   1380
accgttgtcc agaacgtcac cgacgctgag ggcggcgagg tcaactccaa ggcaatgtgg   1440
gatatcttcg ccaccgagta cctggagcgc accgcaccag ttgagcagat cgcgctgcgc   1500
gtcgagaacg ctcagaccga aaacgaggat gcatccatca ccgccgagct catccacaac   1560
ggcaaggacg tcaccgtcga tggccgcggc aacgcccac tggccgctta cgccaacgcg   1620
ctggagaagc tgggcatcga cgttgagatc caggaataca accagcacgc ccgcacctcg   1680
ggcgacgatg cagaagcagc cgcctacgtg ctggctgagg tcaacggccg caaggtctgg   1740
ggcgtcggca tcgctggctc catcacctac gcttcgctga aggcagtgac ctccgccgta   1800
aaccgcgcgc tggacgtcaa ccacgaggca gtcctggctg gcggcgttta a            1851

<210> SEQ ID NO 3
<211> LENGTH: 21
<212> TYPE: DNA
<213> ORGANISM: Artificial Sequence
<220> FEATURE:
<223> OTHER INFORMATION: Primer 1

<400> SEQUENCE: 3
tatgcttcac cacatgactt c                                              21

<210> SEQ ID NO 4
<211> LENGTH: 23
<212> TYPE: DNA
<213> ORGANISM: Artificial Sequence
<220> FEATURE:
<223> OTHER INFORMATION: Primer 2

<400> SEQUENCE: 4
aaatcatttg agaaaactcg agg                                            23

<210> SEQ ID NO 5
<211> LENGTH: 581
<212> TYPE: PRT
<213> ORGANISM: Unknown
<220> FEATURE:
<223> OTHER INFORMATION: leuA(581 aa)

<400> SEQUENCE: 5

Met Pro Val Asn Arg Tyr Met Pro Phe Glu Val Glu Val Glu Asp Ile
 1               5                  10                  15

Ser Leu Pro Asp Arg Thr Trp Pro Asp Lys Lys Ile Thr Val Ala Pro
            20                  25                  30

Gln Trp Cys Ala Val Asp Leu Arg Asp Gly Asn Gln Ala Leu Ile Asp
        35                  40                  45

Pro Met Ser Pro Glu Arg Lys Arg Arg Met Phe Glu Leu Leu Val Gln
    50                  55                  60

Met Gly Phe Lys Glu Ile Glu Val Gly Phe Pro Ser Ala Ser Gln Thr
65                  70                  75                  80
```

```
Asp Phe Asp Phe Val Arg Glu Ile Ile Glu Lys Gly Met Ile Pro Asp
                85                  90                  95

Asp Val Thr Ile Gln Val Leu Val Gln Ala Arg Glu His Leu Ile Arg
            100                 105                 110

Arg Thr Phe Glu Ala Cys Glu Gly Ala Lys Asn Val Ile Val His Phe
        115                 120                 125

Tyr Asn Ser Thr Ser Ile Leu Gln Arg Asn Val Val Phe Arg Met Asp
    130                 135                 140

Lys Val Gln Val Lys Lys Leu Ala Thr Asp Ala Ala Glu Leu Ile Lys
145                 150                 155                 160

Thr Ile Ala Gln Asp Tyr Pro Asp Thr Asn Trp Arg Trp Gln Tyr Ser
                165                 170                 175

Pro Glu Ser Phe Thr Gly Thr Glu Val Glu Tyr Ala Lys Glu Val Val
            180                 185                 190

Asp Ala Val Val Glu Val Met Asp Pro Thr Pro Glu Asn Pro Met Ile
        195                 200                 205

Ile Asn Leu Pro Ser Thr Val Glu Met Ile Thr Pro Asn Val Tyr Ala
    210                 215                 220

Asp Ser Ile Glu Trp Met His Arg Asn Leu Asn Arg Arg Asp Ser Ile
225                 230                 235                 240

Ile Leu Ser Leu His Pro His Asn Asp Arg Gly Thr Gly Val Gly Ala
                245                 250                 255

Ala Glu Leu Gly Tyr Met Ala Gly Ala Asp Arg Ile Glu Gly Cys Leu
            260                 265                 270

Phe Gly Asn Gly Glu Arg Thr Gly Asn Val Cys Leu Val Thr Leu Ala
        275                 280                 285

Leu Asn Met Leu Thr Gln Gly Val Asp Pro Gln Leu Asp Phe Thr Asp
    290                 295                 300

Ile Arg Gln Ile Arg Ser Thr Val Glu Tyr Cys Asn Gln Leu Arg Val
305                 310                 315                 320

Pro Glu Arg His Pro Tyr Gly Gly Asp Leu Val Phe Thr Ala Phe Ser
                325                 330                 335

Gly Ser His Gln Asp Ala Val Asn Lys Gly Leu Asp Ala Met Ala Ala
            340                 345                 350

Lys Val Gln Pro Gly Ala Ser Ser Thr Glu Val Ser Trp Glu Gln Leu
        355                 360                 365

Arg Asp Thr Glu Trp Glu Val Pro Tyr Leu Pro Ile Asp Pro Lys Asp
    370                 375                 380

Val Gly Arg Asp Tyr Glu Ala Val Ile Arg Val Asn Ser Gln Ser Gly
385                 390                 395                 400

Lys Gly Gly Val Ala Tyr Ile Met Lys Thr Asp His Gly Leu Gln Ile
                405                 410                 415

Pro Arg Ser Met Gln Val Glu Phe Ser Thr Val Val Gln Asn Val Thr
            420                 425                 430

Asp Ala Glu Gly Gly Glu Val Asn Ser Lys Ala Met Trp Asp Ile Phe
        435                 440                 445

Ala Thr Glu Tyr Leu Glu Arg Thr Ala Pro Val Glu Gln Ile Ala Leu
    450                 455                 460

Arg Val Glu Asn Ala Gln Thr Glu Asn Glu Asp Ala Ser Ile Thr Ala
465                 470                 475                 480

Glu Leu Ile His Asn Gly Lys Asp Val Thr Val Asp Gly Arg Gly Asn
                485                 490                 495
```

```
Gly Pro Leu Ala Ala Tyr Ala Asn Ala Leu Glu Lys Leu Gly Ile Asp
            500                 505                 510

Val Glu Ile Gln Glu Tyr Asn Gln His Ala Arg Thr Ser Gly Asp Asp
        515                 520                 525

Ala Glu Ala Ala Ala Tyr Val Leu Ala Glu Val Asn Gly Arg Lys Val
        530                 535                 540

Trp Gly Val Gly Ile Ala Gly Ser Ile Thr Tyr Ala Ser Leu Lys Ala
545                 550                 555                 560

Val Thr Ser Ala Val Asn Arg Ala Leu Asp Val Asn His Glu Ala Val
                565                 570                 575

Leu Ala Gly Gly Val
            580

<210> SEQ ID NO 6
<211> LENGTH: 616
<212> TYPE: PRT
<213> ORGANISM: Artificial Sequence
<220> FEATURE:
<223> OTHER INFORMATION: L138G

<400> SEQUENCE: 6

Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Gly Val Gln Ala Arg Glu His
130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Ser Pro Glu Ser Phe Thr Gly Thr Glu Val Glu Tyr Ala Lys
    210                 215                 220

Glu Val Val Asp Ala Val Val Glu Val Met Asp Pro Thr Pro Glu Asn
225                 230                 235                 240

Pro Met Ile Ile Asn Leu Pro Ser Thr Val Glu Met Ile Thr Pro Asn
                245                 250                 255

Val Tyr Ala Asp Ser Ile Glu Trp Met His Arg Asn Leu Asn Arg Arg
            260                 265                 270
```

Asp Ser Ile Ile Leu Ser Leu His Pro His Asn Asp Arg Gly Thr Gly
            275                 280                 285

Val Gly Ala Ala Glu Leu Gly Tyr Met Ala Gly Ala Asp Arg Ile Glu
    290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
            340                 345                 350

Leu Arg Val Pro Glu Arg His Pro Tyr Gly Gly Asp Leu Val Phe Thr
        355                 360                 365

Ala Phe Ser Gly Ser His Gln Asp Ala Val Asn Lys Gly Leu Asp Ala
    370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
            420                 425                 430

Gln Ser Gly Lys Gly Val Ala Tyr Ile Met Lys Thr Asp His Gly
        435                 440                 445

Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
            500                 505                 510

Ile Thr Ala Glu Leu Ile His Asn Gly Lys Asp Val Thr Val Asp Gly
        515                 520                 525

Arg Gly Asn Gly Pro Leu Ala Ala Tyr Ala Asn Ala Leu Glu Lys Leu
    530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
        595                 600                 605

Glu Ala Val Leu Ala Gly Gly Val
    610                 615

<210> SEQ ID NO 7
<211> LENGTH: 1851
<212> TYPE: DNA
<213> ORGANISM: Artificial Sequence
<220> FEATURE:
<223> OTHER INFORMATION: L138G

<400> SEQUENCE: 7
atgtctccta acgatgcatt catctccgca cctgccaaga tcgaaacccc agttgggcct      60
cgcaatgaag gccagccagc atggaataag cagcgtggct cctcaatgcc agttaaccgc     120

```
tacatgcctt tcgaggttga ggtagaagat atttctctgc cggaccgcac ttggccagat      180
aaaaaaatca ccgttgcacc tcagtggtgt gctgttgacc tgcgtgacgg caaccaggct      240
ctgattgatc cgatgtctcc tgagcgtaag cgccgcatgt ttgagctgct ggttcagatg      300
ggattcaagg aaatcgaggt cggtttccct tcagcttccc agactgattt tgatttcgtt      360
cgtgagatca tcgaaaagga catgatccct gacgatgtca ccattcaggt tggggttcag      420
gctcgtgagc acctgattcg ccgtactttt gaagcttgcg aaggcgcaaa aaacgttatc      480
gtgcacttct acaactcaac ctccatcctg cagcgcaacg tggtgttccg catggacaag      540
gtgcaggtga agaagctggc taccgatgcc gctgaactga tcaagaccgt cgctcaggat      600
tacccagaca ccaactggcg ctggcagtac tcccctgagt ccttcaccgg cactgaggtt      660
gagtacgcca aggaagttgt ggacgcagtt gttgaggtca tggatccaac tcctgagaac      720
ccaatgatca tcaacctgcc ttccaccgtt gagatgatca cccctaacgt ttacgcagac      780
tccattgaat ggatgcaccg caatctaaac cgtcgtgatt ccattatcct gtccctgcac      840
ccgcacaatg accgtggcac cggcgttggc gcagctgagc tgggctacat ggctggcgct      900
gaccgcatcg aaggctgcct gttcggcaac ggcgagcgca ccggcaacgt ctgcctggtc      960
accctggcac tgaacatgct gacccagggc gttgaccctc agctggactt caccgatata     1020
cgccagatcc gcagcaccgt tgaatactgc aaccagctgc gcgttcctga cgccaccca      1080 tacggcggcg acctggtctt caccgctttc tccggttccc accaggacgc tgtgaacaag     1140
ggtctggacg ccatggctgc caaggttcag ccaggtgcta gctccactga gtttcttgg      1200 gagcagctgc gcgacaccga atgggaggtt ccttacctgc ctatcgatcc aaaggatgtc     1260
ggtcgcgact acgaggctgt tatccgcgtg aactcccagt ccggcaaggg cggcgttgct     1320
tacatcatga agaccgatca cggtctgcag atccctcgct ccatgcaggt tgagttctcc     1380
accgttgtcc agaacgtcac cgacgctgag ggcggcgagg tcaactccaa ggcaatgtgg     1440
gatatcttcg ccaccgagta cctggagcgc accgcaccag ttgagcagat cgcgctgcgc     1500
gtcgagaacg ctcagaccga aaacgaggat gcatccatca ccgccgagct catccacaac     1560
ggcaaggacg tcaccgtcga tggccacggc aacgccccac tggctgctta cgccaacgcg     1620
ctggagaagc tgggcatcga cgttgagatc caggaataca accagcacgc ccgcacctcg     1680
ggcgacgatg cagaagcagc cgcctacgtg ctggctgagg tcaacggccg caaggtctgg     1740
ggcgtcggca tcgctggctc catcacctac gcttcgctga aggcagtgac ctccgccgta     1800
aaccgcgcgc tggacgtcaa ccacgaggca gtcctggctg cggcgttta a              1851
```

<210> SEQ ID NO 8
<211> LENGTH: 616
<212> TYPE: PRT
<213> ORGANISM: Artificial Sequence
<220> FEATURE:
<223> OTHER INFORMATION: H162E

<400> SEQUENCE: 8

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
```

```
              50                  55                  60
Val Ala Pro Gln Trp Cys Ala Val Asp Leu Arg Asp Gly Asn Gln Ala
 65                  70                  75                  80

Leu Ile Asp Pro Met Ser Pro Glu Arg Lys Arg Arg Met Phe Glu Leu
                 85                  90                  95

Leu Val Gln Met Gly Phe Lys Glu Ile Glu Val Gly Phe Pro Ser Ala
                100                 105                 110

Ser Gln Thr Asp Phe Asp Phe Val Arg Glu Ile Ile Glu Lys Gly Met
                115                 120                 125

Ile Pro Asp Asp Val Thr Ile Gln Val Gly Val Gln Ala Arg Glu His
                130                 135                 140

Leu Ile Arg Arg Thr Phe Glu Ala Cys Glu Gly Ala Lys Asn Val Ile
145                 150                 155                 160

Val Glu Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
                180                 185                 190

Leu Ile Lys Thr Ile Ala Gln Asp Tyr Pro Asp Thr Asn Trp Arg Trp
                195                 200                 205

Gln Tyr Ser Pro Glu Ser Phe Thr Gly Thr Glu Val Glu Tyr Ala Lys
                210                 215                 220

Glu Val Asp Ala Val Val Glu Val Met Asp Pro Thr Pro Glu Asn
225                 230                 235                 240

Pro Met Ile Ile Asn Leu Pro Ser Thr Val Glu Met Ile Thr Pro Asn
                245                 250                 255

Val Tyr Ala Asp Ser Ile Glu Trp Met His Arg Asn Leu Asn Arg Arg
                260                 265                 270

Asp Ser Ile Ile Leu Ser Leu His Pro His Asn Asp Arg Gly Thr Gly
                275                 280                 285

Val Gly Ala Ala Glu Leu Gly Tyr Met Ala Gly Ala Asp Arg Ile Glu
                290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
                340                 345                 350

Leu Arg Val Pro Glu Arg His Pro Tyr Gly Gly Asp Leu Val Phe Thr
                355                 360                 365

Ala Phe Ser Gly Ser His Gln Asp Ala Val Asn Lys Gly Leu Asp Ala
                370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
                420                 425                 430

Gln Ser Gly Lys Gly Gly Val Ala Tyr Ile Met Lys Thr Asp His Gly
                435                 440                 445

Leu Gln Ile Pro Arg Ser Met Gln Val Glu Phe Ser Thr Val Val Gln
                450                 455                 460

Asn Val Thr Asp Ala Glu Gly Gly Glu Val Asn Ser Lys Ala Met Trp
465                 470                 475                 480
```

Asp Ile Phe Ala Thr Glu Tyr Leu Glu Arg Thr Ala Pro Val Glu Gln
            485                 490                 495

Ile Ala Leu Arg Val Glu Asn Ala Gln Thr Glu Asn Glu Asp Ala Ser
        500                 505                 510

Ile Thr Ala Glu Leu Ile His Asn Gly Lys Asp Val Thr Val Asp Gly
        515                 520                 525

Arg Gly Asn Gly Pro Leu Ala Ala Tyr Ala Asn Ala Leu Glu Lys Leu
        530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
            565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
        595                 600                 605

Glu Ala Val Leu Ala Gly Gly Val
        610                 615

<210> SEQ ID NO 9
<211> LENGTH: 1851
<212> TYPE: DNA
<213> ORGANISM: Artificial Sequence
<220> FEATURE:
<223> OTHER INFORMATION: H162E

<400> SEQUENCE: 9

| | | | | | |
|---|---|---|---|---|---|
| atgtctccta | acgatgcatt | catctccgca | cctgccaaga | tcgaaacccc | agttgggcct | 60 |
| cgcaatgaag | gccagccagc | atggaataag | cagcgtggct | cctcaatgcc | agttaaccgc | 120 |
| tacatgcctt | tcgaggttga | ggtagaagat | atttctctgc | cggaccgcac | ttggccagat | 180 |
| aaaaaaatca | ccgttgcacc | tcagtggtgt | gctgttgacc | tgcgtgacgg | caaccaggct | 240 |
| ctgattgatc | cgatgtctcc | tgagcgtaag | cgccgcatgt | ttgagctgct | ggttcagatg | 300 |
| ggattcaagg | aaatcgaggt | cggtttccct | tcagcttccc | agactgattt | tgatttcgtt | 360 |
| cgtgagatca | tcgaaaagga | catgatccct | gacgatgtca | ccattcaggt | tctggttcag | 420 |
| gctcgtgagc | acctgattcg | ccgtactttt | gaagcttgcg | aaggcgcaaa | aaacgttatc | 480 |
| gtggagttct | acaactcaac | ctccatcctg | cagcgcaacg | tggtgttccg | catggacaag | 540 |
| gtgcaggtga | agaagctggc | taccgatgcc | gctgaactga | tcaagaccgt | cgctcaggat | 600 |
| tacccagaca | ccaactggcg | ctggcagtac | tcccctgagt | ccttcaccgg | cactgaggtt | 660 |
| gagtacgcca | aggaagttgt | ggacgcagtt | gttgaggtca | tggatccaac | tcctgagaac | 720 |
| ccaatgatca | tcaacctgcc | ttccaccgtt | gagatgatca | cccctaacgt | ttacgcagac | 780 |
| tccattgaat | ggatgcaccg | caatctaaac | cgtcgtgatt | ccattatcct | gtccctgcac | 840 |
| ccgcacaatg | accgtggcac | cggcgttggc | gcagctgagc | tgggctacat | ggctggcgct | 900 |
| gaccgcatcg | aaggctgcct | gttcggcaac | ggcgagcgca | ccggcaacgt | ctgcctggtc | 960 |
| accctggcac | tgaacatgct | gacccagggc | gttgaccctc | agctggactt | caccgatata | 1020 |
| cgccagatcc | gcagcaccgt | tgaatactgc | aaccagctgc | gcgttcctga | gcgccaccca | 1080 |
| tacggcggcg | acctggtctt | caccgctttc | tccggttccc | accaggacgc | tgtgaacaag | 1140 |
| ggtctggacg | ccatggctgc | caaggttcag | ccaggtgcta | gctccactga | agtttcttgg | 1200 |
| gagcagctgc | gcgacaccga | atgggaggtt | ccttacctgc | ctatcgatcc | aaaggatgtc | 1260 |

```
ggtcgcgact acgaggctgt tatccgcgtg aactcccagt ccggcaaggg cggcgttgct    1320
tacatcatga agaccgatca cggtctgcag atccctcgct ccatgcaggt tgagttctcc    1380
accgttgtcc agaacgtcac cgacgctgag ggcggcgagg tcaactccaa ggcaatgtgg    1440
gatatcttcg ccaccgagta cctggagcgc accgcaccag ttgagcagat cgcgctgcgc    1500
gtcgagaacg ctcagaccga aaacgaggat gcatccatca ccgccgagct catccacaac    1560
ggcaaggacg tcaccgtcga tggccacggc aacggcccac tggctgctta cgccaacgcg    1620
ctggagaagc tgggcatcga cgttgagatc caggaataca accagcacgc ccgcacctcg    1680
ggcgacgatg cagaagcagc cgcctacgtg ctggctgagg tcaacggccg caaggtctgg    1740
ggcgtcggca tcgctggctc catcacctac gcttcgctga aggcagtgac ctccgccgta    1800
aaccgcgcgc tggacgtcaa ccacgaggca gtcctggctg cggcgtttaa               1851
```

\<210\> SEQ ID NO 10
\<211\> LENGTH: 616
\<212\> TYPE: PRT
\<213\> ORGANISM: Artificial Sequence
\<220\> FEATURE:
\<223\> OTHER INFORMATION: S211L

\<400\> SEQUENCE: 10

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Gly Val Gln Ala Arg Glu His
    130                 135                 140

Leu Ile Arg Arg Thr Phe Glu Ala Cys Glu Gly Ala Lys Asn Val Ile
145                 150                 155                 160

Val Glu Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Leu Pro Glu Ser Phe Thr Gly Thr Glu Val Glu Tyr Ala Lys
    210                 215                 220

Glu Val Val Asp Ala Val Val Glu Val Met Asp Pro Thr Pro Glu Asn
225                 230                 235                 240

Pro Met Ile Ile Asn Leu Pro Ser Thr Val Glu Met Ile Thr Pro Asn
                245                 250                 255
```

Val Tyr Ala Asp Ser Ile Glu Trp Met His Arg Asn Leu Asn Arg Arg
            260                 265                 270

Asp Ser Ile Ile Leu Ser Leu His Pro His Asn Asp Arg Gly Thr Gly
        275                 280                 285

Val Gly Ala Ala Glu Leu Gly Tyr Met Ala Gly Ala Asp Arg Ile Glu
    290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
            325                 330                 335

Phe Thr Asp Ile Arg Gln Ile Arg Ser Thr Val Glu Tyr Cys Asn Gln
        340                 345                 350

Leu Arg Val Pro Glu Arg His Pro Tyr Gly Gly Asp Leu Val Phe Thr
    355                 360                 365

Ala Phe Ser Gly Ser His Gln Asp Ala Val Asn Lys Gly Leu Asp Ala
    370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
            405                 410                 415

Pro Lys Asp Val Gly Arg Asp Tyr Glu Ala Val Ile Arg Val Asn Ser
        420                 425                 430

Gln Ser Gly Lys Gly Gly Val Ala Tyr Ile Met Lys Thr Asp His Gly
    435                 440                 445

Leu Gln Ile Pro Arg Ser Met Gln Val Glu Phe Ser Thr Val Val Gln
    450                 455                 460

Asn Val Thr Asp Ala Glu Gly Gly Val Asn Ser Lys Ala Met Trp
465                 470                 475                 480

Asp Ile Phe Ala Thr Glu Tyr Leu Glu Arg Thr Ala Pro Val Glu Gln
            485                 490                 495

Ile Ala Leu Arg Val Glu Asn Ala Gln Thr Glu Asn Glu Asp Ala Ser
        500                 505                 510

Ile Thr Ala Glu Leu Ile His Asn Gly Lys Asp Val Thr Val Asp Gly
    515                 520                 525

Arg Gly Asn Gly Pro Leu Ala Ala Tyr Ala Asn Ala Leu Glu Lys Leu
530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
            565                 570                 575

Arg Lys Val Trp Gly Val Gly Ile Ala Gly Ser Ile Thr Tyr Ala Ser
        580                 585                 590

Leu Lys Ala Val Thr Ser Ala Val Asn Arg Ala Leu Asp Val Asn His
    595                 600                 605

Glu Ala Val Leu Ala Gly Gly Val
    610                 615

<210> SEQ ID NO 11
<211> LENGTH: 1851
<212> TYPE: DNA
<213> ORGANISM: Artificial Sequence
<220> FEATURE:
<223> OTHER INFORMATION: S211L

<400> SEQUENCE: 11

```
atgtctccta acgatgcatt catctccgca cctgccaaga tcgaaacccc agttgggcct    60
cgcaatgaag gccagccagc atggaataag cagcgtggct cctcaatgcc agttaaccgc   120
tacatgcctt tcgaggttga ggtagaagat atttctctgc cggaccgcac ttggccagat   180
aaaaaaatca ccgttgcacc tcagtggtgt gctgttgacc tgcgtgacgg caaccaggct   240
ctgattgatc cgatgtctcc tgagcgtaag cgccgcatgt ttgagctgct ggttcagatg   300
ggattcaagg aaatcgaggt cggtttccct tcagcttccc agactgattt tgatttcgtt   360
cgtgagatca tcgaaaagga catgatccct gacgatgtca ccattcaggt tctggttcag   420
gctcgtgagc acctgattcg ccgtactttt gaagcttgcg aaggcgcaaa aaacgttatc   480
gtgcacttct acaactcaac ctccatcctg cagcgcaacg tggtgttccg catggacaag   540
gtgcaggtga agaagctggc taccgatgcc gctgaactga tcaagaccgt cgctcaggat   600
tacccagaca ccaactggcg ctggcagtac cttcctgagt ccttcaccgg cactgaggtt   660
gagtacgcca aggaagttgt ggacgcagtt gttgaggtca tggatccaac tcctgagaac   720
ccaatgatca tcaacctgcc ttccaccgtt gagatgatca cccctaacgt ttacgcagac   780
tccattgaat ggatgcaccg caatctaaac cgtcgtgatt ccattatcct gtccctgcac   840
ccgcacaatg accgtggcac cggcgttggc gcagctgagc tgggctacat ggctggcgct   900
gaccgcatcg aaggctgcct gttcggcaac ggcgagcgca ccggcaacgt ctgcctggtc   960
accctggcac tgaacatgct gacccagggc gttgaccctc agctggactt caccgatata  1020
cgccagatcc gcagcaccgt tgaatactgc aaccagctgc gcgttcctga gcgccaccca  1080
tacgccggcg acctggtctt caccgctttc tccggttccc accaggacgc tgtgaacaag  1140
ggtctggacg ccatggctgc caaggttcag ccaggtgcta gctccactga gtttcttgg  1200
gagcagctgc gcgacaccga atgggaggtt ccttacctgc ctatcgatcc aaaggatgtc  1260
ggtcgcgact acgaggctgt tatccgcgtg aactcccagt ccggcaaggg cggcgttgct  1320
tacatcatga gaccgatca cggtctgcag atccctcgct ccatgcaggt tgagttctcc  1380
accgttgtcc agaacgtcac cgacgctgag ggcggcgagg tcaactccaa ggcaatgtgg  1440
gatatcttcg ccaccgagta cctggagcgc accgcaccag ttgagcagat cgcgctgcgc  1500
gtcgagaacg ctcagaccga aaacgaggat gcatccatca ccgccgagct catccacaac  1560
ggcaaggacg tcaccgtcga tggccacggc aacggcccac tggctgctta cgccaacgcg  1620
ctggagaagc tgggcatcga cgttgagatc aggaatacaa ccagcacgc ccgcacctcg  1680
ggcgacgatg cagaagcagc cgcctacgtg ctggctgagg tcaacggccg caaggtctgg  1740
ggcgtcggca tcgctggctc catcacctac gcttcgctga aggcagtgac ctccgccgta  1800
aaccgcgcgc tggacgtcaa ccacgaggca gtcctggctg gcggcgttta a           1851
```

<210> SEQ ID NO 12  
<211> LENGTH: 616  
<212> TYPE: PRT  
<213> ORGANISM: Artificial Sequence  
<220> FEATURE:  
<223> OTHER INFORMATION: I588P

<400> SEQUENCE: 12

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
```

```
                 35                  40                  45
Glu Asp Ile Ser Leu Pro Asp Arg Thr Trp Pro Asp Lys Lys Ile Thr
 50                  55                  60
Val Ala Pro Gln Trp Cys Ala Val Asp Leu Arg Asp Gly Asn Gln Ala
 65                  70                  75                  80
Leu Ile Asp Pro Met Ser Pro Glu Arg Lys Arg Met Phe Glu Leu
                 85                  90                  95
Leu Val Gln Met Gly Phe Lys Glu Ile Glu Val Gly Phe Pro Ser Ala
                100                 105                 110
Ser Gln Thr Asp Phe Asp Phe Val Arg Glu Ile Ile Glu Lys Gly Met
                115                 120                 125
Ile Pro Asp Asp Val Thr Ile Gln Val Gly Val Gln Ala Arg Glu His
            130                 135                 140
Leu Ile Arg Arg Thr Phe Glu Ala Cys Glu Gly Ala Lys Asn Val Ile
145                 150                 155                 160
Val Glu Phe Tyr Asn Ser Thr Ser Ile Leu Gln Arg Asn Val Val Phe
                165                 170                 175
Arg Met Asp Lys Val Gln Val Lys Lys Leu Ala Thr Asp Ala Ala Glu
            180                 185                 190
Leu Ile Lys Thr Ile Ala Gln Asp Tyr Pro Asp Thr Asn Trp Arg Trp
            195                 200                 205
Gln Tyr Leu Pro Glu Ser Phe Thr Gly Thr Glu Val Glu Tyr Ala Lys
210                 215                 220
Glu Val Val Asp Ala Val Val Glu Val Met Asp Pro Thr Pro Glu Asn
225                 230                 235                 240
Pro Met Ile Ile Ser Leu Pro Ser Thr Val Glu Met Ile Thr Pro Asn
                245                 250                 255
Val Tyr Ala Asp Ser Ile Glu Trp Met His Arg Asn Leu Asn Arg Arg
            260                 265                 270
Asp Ser Ile Ile Leu Ser Leu His Pro His Asn Asp Arg Gly Thr Gly
            275                 280                 285
Val Gly Ala Ala Glu Leu Gly Tyr Met Ala Gly Ala Asp Arg Ile Glu
290                 295                 300
Gly Cys Leu Phe Gly Asn Gly Glu Arg Thr Gly Asn Val Cys Leu Val
305                 310                 315                 320
Thr Leu Ala Leu Asn Met Leu Thr Gln Gly Val Asp Pro Gln Leu Asp
                325                 330                 335
Phe Thr Asp Ile Arg Gln Ile Arg Ser Thr Val Glu Tyr Cys Asn Gln
            340                 345                 350
Leu Arg Val Pro Glu Arg His Pro Tyr Gly Gly Asp Leu Val Phe Thr
            355                 360                 365
Ala Phe Ser Gly Ser His Gln Asp Ala Val Asn Lys Gly Leu Asp Ala
            370                 375                 380
Met Ala Ala Lys Val Gln Pro Gly Ala Ser Thr Glu Val Ser Trp
385                 390                 395                 400
Glu Gln Leu Arg Asp Thr Glu Trp Glu Val Pro Tyr Leu Pro Ile Asp
                405                 410                 415
Pro Lys Asp Val Gly Arg Asp Tyr Glu Ala Val Ile Arg Val Asn Ser
            420                 425                 430
Gln Ser Gly Lys Gly Gly Val Ala Tyr Ile Met Lys Thr Asp His Gly
            435                 440                 445
Leu Gln Ile Pro Arg Ser Met Gln Val Glu Phe Ser Thr Val Val Gln
            450                 455                 460
```

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Gly Asp Ala Ser
            500                 505                 510

Ile Thr Ala Glu Leu Ile His Asn Gly Lys Asp Val Thr Val Asp Gly
        515                 520                 525

Arg Gly Asn Gly Pro Leu Ala Ala Tyr Ala Asn Ala Leu Glu Lys Leu
    530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
                565                 570                 575

Arg Lys Val Trp Gly Val Gly Ile Ala Gly Ser Pro Thr Tyr Ala Ser
                580                 585                 590

Leu Lys Ala Val Thr Ser Ala Val Asn Arg Ala Leu Asp Val Asn His
            595                 600                 605

Glu Ala Val Leu Ala Gly Gly Val
    610                 615

<210> SEQ ID NO 13
<211> LENGTH: 1851
<212> TYPE: DNA
<213> ORGANISM: Artificial Sequence
<220> FEATURE:
<223> OTHER INFORMATION: I588P

<400> SEQUENCE: 13

| | |
|---|---|
| atgtctccta acgatgcatt catctccgca cctgccaaga tcgaaacccc agttgggcct | 60 |
| cgcaatgaag gccagccagc atggaataag cagcgtggct cctcaatgcc agttaaccgc | 120 |
| tacatgcctt tcgaggttga ggtagaagat atttctctgc cggaccgcac ttggccagat | 180 |
| aaaaaaatca ccgttgcacc tcagtggtgt gctgttgacc tgcgtgacgg caaccaggct | 240 |
| ctgattgatc cgatgtctcc tgagcgtaag cgccgcatgt tgagctgct ggttcagatg | 300 |
| ggattcaagg aaatcgaggt cggttttccct tcagcttccc agactgattt tgatttcgtt | 360 |
| cgtgagatca tcgaaaagga catgatccct gacgatgtca ccattcaggt tctggttcag | 420 |
| gctcgtgagc acctgattcg ccgtactttt gaagcttgcg aaggcgcaaa aaacgttatc | 480 |
| gtgcacttct acaactcaac ctccatcctg cagcgcaacg tggtgttccg catggacaag | 540 |
| gtgcaggtga agaagctggc taccgatgcc gctgaactga tcaagaccgt cgctcaggat | 600 |
| tacccagaca ccaactggcg ctggcagtac tcccctgagt ccttcaccgg cactgaggtt | 660 |
| gagtacgcca aggaagttgt ggacgcagtt gttgaggtca tggatccaac tcctgagaac | 720 |
| ccaatgatca tcaacctgcc ttccaccgtt gagatgatca cccctaacgt ttacgcagac | 780 |
| tccattgaat ggatgcaccg caatctaaac cgtcgtgatt ccattatcct gtccctgcac | 840 |
| ccgcacaatg accgtggcac cggcgttggc gcagctgagc tgggctacat ggctggcgct | 900 |
| gaccgcatcg aaggctgcct gttcggcaac ggcgagcgca ccggcaacgt ctgcctggtc | 960 |
| accctggcac tgaacatgct gacccagggc gttgaccctc agctggactt caccgatata | 1020 |
| cgccagatcc gcagcaccgt tgaatactgc aaccagctgc gcgttcctga gcgccaccca | 1080 |
| tacggcggcg acctggtctt caccgctttc tccggttccc accaggacgc tgtgaacaag | 1140 |

-continued

```
ggtctggacg ccatggctgc caaggttcag ccaggtgcta gctccactga agtttcttgg    1200
gagcagctgc gcgacaccga atgggaggtt ccttacctgc ctatcgatcc aaaggatgtc    1260
ggtcgcgact acgaggctgt tatccgcgtg aactcccagt ccggcaaggg cggcgttgct    1320
tacatcatga agaccgatca cggtctgcag atccctcgct ccatgcaggt tgagttctcc    1380
accgttgtcc agaacgtcac cgacgctgag ggcggcgagg tcaactccaa ggcaatgtgg    1440
gatatcttcg ccaccgagta cctggagcgc accgcaccag ttgagcagat cgcgctgcgc    1500
gtcgagaacg ctcagaccga aaacgaggat gcatccatca ccgccgagct catccacaac    1560
ggcaaggacg tcaccgtcga tggccacggc aacggcccac tggctgctta cgccaacgcg    1620
ctggagaagc tgggcatcga cgttgagatc caggaataca accagcacgc ccgcacctcg    1680
ggcgacgatg cagaagcagc cgcctacgtg ctggctgagg tcaacggccg caaggtctgg    1740
ggcgtcggca tcgctggctc ccccacctac gcttcgctga aggcagtgac ctccgccgta    1800
aaccgcgcgc tggacgtcaa ccacgaggca gtcctggctg cggcgtttta a             1851
```

<210> SEQ ID NO 14
<211> LENGTH: 616
<212> TYPE: PRT
<213> ORGANISM: Artificial Sequence
<220> FEATURE:
<223> OTHER INFORMATION: N245S

<400> SEQUENCE: 14

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Gly Val Gln Ala Arg Glu His
    130                 135                 140

Leu Ile Arg Arg Thr Phe Glu Ala Cys Glu Gly Ala Lys Asn Val Ile
145                 150                 155                 160

Val Glu Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Leu Pro Glu Ser Phe Thr Gly Thr Glu Val Glu Tyr Ala Lys
    210                 215                 220

Glu Val Val Asp Ala Val Val Glu Val Met Asp Pro Thr Pro Glu Asn
225                 230                 235                 240
```

```
Pro Met Ile Ile Ser Leu Pro Ser Thr Val Glu Met Ile Thr Pro Asn
            245                 250                 255

Val Tyr Ala Asp Ser Ile Glu Trp Met His Arg Asn Leu Asn Arg Arg
        260                 265                 270

Asp Ser Ile Ile Leu Ser Leu His Pro His Asn Asp Arg Gly Thr Gly
    275                 280                 285

Val Gly Ala Ala Glu Leu Gly Tyr Met Ala Gly Ala Asp Arg Ile Glu
290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
            340                 345                 350

Leu Arg Val Pro Glu Arg His Pro Tyr Gly Gly Asp Leu Val Phe Thr
        355                 360                 365

Ala Phe Ser Gly Ser His Gln Asp Ala Val Asn Lys Gly Leu Asp Ala
    370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
            420                 425                 430

Gln Ser Gly Lys Gly Val Ala Tyr Ile Met Lys Thr Asp His Gly
        435                 440                 445

Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
            500                 505                 510

Ile Thr Ala Glu Leu Ile His Asn Gly Lys Asp Val Thr Val Asp Gly
        515                 520                 525

Arg Gly Asn Gly Pro Leu Ala Ala Tyr Ala Asn Ala Leu Glu Lys Leu
    530                 535                 540

Gly Ile Asp Val Glu Ile Gln Glu Tyr Asn Gln His Ala Arg Thr Ser
545                 550                 555                 560

Gly Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
        595                 600                 605

Glu Ala Val Leu Ala Gly Gly Val
    610                 615

<210> SEQ ID NO 15
<211> LENGTH: 1851
<212> TYPE: DNA
<213> ORGANISM: Artificial Sequence
<220> FEATURE:
<223> OTHER INFORMATION: N245S
```

<400> SEQUENCE: 15

```
atgtctccta acgatgcatt catctccgca cctgccaaga tcgaaacccc agttgggcct      60
cgcaatgaag gccagccagc atggaataag cagcgtggct cctcaatgcc agttaaccgc     120
tacatgcctt tcgaggttga ggtagaagat atttctctgc cggaccgcac ttggccagat     180
aaaaaaatca ccgttgcacc tcagtggtgt gctgttgacc tgcgtgacgg caaccaggct     240
ctgattgatc cgatgtctcc tgagcgtaag cgccgcatgt ttgagctgct ggttcagatg     300
ggattcaagg aaatcgaggt cggtttccct tcagcttccc agactgattt tgatttcgtt     360
cgtgagatca tcgaaaagga catgatccct gacgatgtca ccattcaggt tctggttcag     420
gctcgtgagc acctgattcg ccgtactttt gaagcttgcg aaggcgcaaa aaacgttatc     480
gtgcacttct acaactcaac ctccatcctg cagcgcaacg tggtgttccg catggacaag     540
gtgcaggtga agaagctggc taccgatgcc gctgaactga tcaagaccgt cgctcaggat     600
tacccagaca ccaactggcg ctggcagtac tcccctgagt ccttcaccgg cactgaggtt     660
gagtacgcca aggaagttgt ggacgcagtt gttgaggtca tggatccaac tcctgagaac     720
ccaatgatca tctccctgcc ttccaccgtt gagatgatca cccctaacgt ttacgcagac     780
tccattgaat ggatgcaccg caatctaaac cgtcgtgatt ccattatcct gtccctgcac     840
ccgcacaatg accgtggcac cggcgttggc gcagctgagc tgggctacat ggctggcgct     900
gaccgcatcg aaggctgcct gttcggcaac ggcgagcgca ccgcaacgt ctgcctggtc     960
accctggcac tgaacatgct gacccagggc gttgaccctc agctggactt caccgatata    1020
cgccagatcc gcagcaccgt tgaatactgc aaccagctgc gcgttcctga gcgccaccca    1080
tacggcggcg acctggtctt caccgctttc tccggttccc accaggacgc tgtgaacaag    1140
ggtctggacg ccatggctgc caaggttcag ccaggtgcta gctccactga gtttcttgg     1200
gagcagctgc gcgacaccga atgggaggtt ccttacctgc ctatcgatcc aaaggatgtc    1260
ggtcgcgact acgaggctgt tatccgcgtg aactcccagt ccggcaaggg cggcgttgct    1320
tacatcatga agaccgatca cggtctgcag atccctcgct ccatgcaggt tgagttctcc    1380
accgttgtcc agaacgtcac cgacgctgag ggcggcgagg tcaactccaa ggcaatgtgg    1440
gatatcttcg ccaccgagta cctggagcgc accgcaccag ttgagcagat cgcgctgcgc    1500
gtcgagaacg ctcagaccga aaacgaggat gcatccatca ccgccgagct catccacaac    1560
ggcaaggacg tcaccgtcga tggccacggc aacggcccac tggctgctta cgccaacgcg    1620
ctggagaagc tgggcatcga cgttgagatc caggaataca accagcacgc ccgcacctcg    1680
ggcgacgatg cagaagcagc cgcctacgtg ctggctgagg tcaacggccg caaggtctgg    1740
ggcgtcggca tcgctggctc catcacctac gcttcgctga aggcagtgac ctccgccgta    1800
aaccgcgcgc tggacgtcaa ccacgaggca gtcctggctg gcggcgttta a              1851
```

<210> SEQ ID NO 16
<211> LENGTH: 42
<212> TYPE: DNA
<213> ORGANISM: Artificial Sequence
<220> FEATURE:
<223> OTHER INFORMATION: Primer 3

<400> SEQUENCE: 16

```
ggtcgactct agaggatccc ctatgcttca ccacatgact tc                          42
```

<210> SEQ ID NO 17

```
<211> LENGTH: 42
<212> TYPE: DNA
<213> ORGANISM: Artificial Sequence
<220> FEATURE:
<223> OTHER INFORMATION: Primer 4

<400> SEQUENCE: 17
caggtgctca cgagcctgaa ccccaacctg aatggtgaca tc                            42

<210> SEQ ID NO 18
<211> LENGTH: 39
<212> TYPE: DNA
<213> ORGANISM: Artificial Sequence
<220> FEATURE:
<223> OTHER INFORMATION: Primer 5

<400> SEQUENCE: 18
gacgatgtca ccattcaggt tggggttcag gctcgtgag                                39

<210> SEQ ID NO 19
<211> LENGTH: 45
<212> TYPE: DNA
<213> ORGANISM: Artificial Sequence
<220> FEATURE:
<223> OTHER INFORMATION: Primer 6

<400> SEQUENCE: 19
gtgaattcga gctcggtacc caaatcattt gagaaaactc gaggc                         45

<210> SEQ ID NO 20
<211> LENGTH: 43
<212> TYPE: DNA
<213> ORGANISM: Artificial Sequence
<220> FEATURE:
<223> OTHER INFORMATION: Primer 7

<400> SEQUENCE: 20
gatggaggtt gagttgtaga actccacgat aacgtttttt gcg                           43

<210> SEQ ID NO 21
<211> LENGTH: 42
<212> TYPE: DNA
<213> ORGANISM: Artificial Sequence
<220> FEATURE:
<223> OTHER INFORMATION: Primer 8

<400> SEQUENCE: 21
ggcgcaaaaa acgttatcgt ggagttctac aactcaacct cc                            42

<210> SEQ ID NO 22
<211> LENGTH: 38
<212> TYPE: DNA
<213> ORGANISM: Artificial Sequence
<220> FEATURE:
<223> OTHER INFORMATION: Primer 9

<400> SEQUENCE: 22
agtgccggtg aaggactcag gaaggtactg ccagcgcc                                 38

<210> SEQ ID NO 23
<211> LENGTH: 39
<212> TYPE: DNA
<213> ORGANISM: Artificial Sequence
<220> FEATURE:
<223> OTHER INFORMATION: Primer 10

<400> SEQUENCE: 23
```

-continued accaactggc gctggcagta ccttcctgag tccttcacc          39

<210> SEQ ID NO 24
<211> LENGTH: 42
<212> TYPE: DNA
<213> ORGANISM: Artificial Sequence
<220> FEATURE:
<223> OTHER INFORMATION: Primer 11

<400> SEQUENCE: 24
catctcaacg gtggaacaca gggagatgat cattgggttc tc          42

<210> SEQ ID NO 25
<211> LENGTH: 37
<212> TYPE: DNA
<213> ORGANISM: Artificial Sequence
<220> FEATURE:
<223> OTHER INFORMATION: Primer 12

<400> SEQUENCE: 25
cctgagaacc caatgatcat ctccctgtgt tccaccg          37

<210> SEQ ID NO 26
<211> LENGTH: 38
<212> TYPE: DNA
<213> ORGANISM: Artificial Sequence
<220> FEATURE:
<223> OTHER INFORMATION: Primer 13

<400> SEQUENCE: 26
tgccttcagc gaagcgtagg tgggggagcc agcgatgc          38

<210> SEQ ID NO 27
<211> LENGTH: 39
<212> TYPE: DNA
<213> ORGANISM: Artificial Sequence
<220> FEATURE:
<223> OTHER INFORMATION: Primer 14

<400> SEQUENCE: 27
ggcgtcggca tcgctggctc ccccacctac gcttcgctg          39

<210> SEQ ID NO 28
<211> LENGTH: 22
<212> TYPE: DNA
<213> ORGANISM: Artificial Sequence
<220> FEATURE:
<223> OTHER INFORMATION: Primer 15

<400> SEQUENCE: 28
aacacgaccg gcatcccgtc gc          22

<210> SEQ ID NO 29
<211> LENGTH: 23
<212> TYPE: DNA
<213> ORGANISM: Artificial Sequence
<220> FEATURE:
<223> OTHER INFORMATION: Primer 16

<400> SEQUENCE: 29
aaatcatttg agaaaactcg agg          23

<210> SEQ ID NO 30
<211> LENGTH: 19
<212> TYPE: DNA

<213> ORGANISM: Artificial Sequence
<220> FEATURE:
<223> OTHER INFORMATION: Primer 23

<400> SEQUENCE: 30
gtcacccgat cgtctgaag                                                    19

<210> SEQ ID NO 31
<211> LENGTH: 18
<212> TYPE: DNA
<213> ORGANISM: Artificial Sequence
<220> FEATURE:
<223> OTHER INFORMATION: Primer 24

<400> SEQUENCE: 31
gtcttaaaac cggttgat                                                     18

<210> SEQ ID NO 32
<211> LENGTH: 42
<212> TYPE: DNA
<213> ORGANISM: Artificial Sequence
<220> FEATURE:
<223> OTHER INFORMATION: gltA M312I Up F

<400> SEQUENCE: 32
gtgaattcga gctcggtacc cgcgggaatc ctgcgttacc gc                           42

<210> SEQ ID NO 33
<211> LENGTH: 42
<212> TYPE: DNA
<213> ORGANISM: Artificial Sequence
<220> FEATURE:
<223> OTHER INFORMATION: gltA M312I Up R

<400> SEQUENCE: 33
tgtaaacgcg gtgtccgaag ccgatgaggc ggacgccgtc tt                           42

<210> SEQ ID NO 34
<211> LENGTH: 42
<212> TYPE: DNA
<213> ORGANISM: Artificial Sequence
<220> FEATURE:
<223> OTHER INFORMATION: gltA M312I Down F

<400> SEQUENCE: 34
aagacggcgt ccgcctcatc ggcttcggac accgcgttta ca                           42

<210> SEQ ID NO 35
<211> LENGTH: 42
<212> TYPE: DNA
<213> ORGANISM: Artificial Sequence
<220> FEATURE:
<223> OTHER INFORMATION: gltA M312I Down R

<400> SEQUENCE: 35
ggtcgactct agaggatccc cttagcgctc ctcgcgagga ac                           42

<210> SEQ ID NO 36
<211> LENGTH: 19
<212> TYPE: DNA
<213> ORGANISM: Artificial Sequence
<220> FEATURE:
<223> OTHER INFORMATION: Primer 25

<400> SEQUENCE: 36
caatgctggc tgcgtacgc                                                    19

-continued

<210> SEQ ID NO 37
<211> LENGTH: 20
<212> TYPE: DNA
<213> ORGANISM: Artificial Sequence
<220> FEATURE:
<223> OTHER INFORMATION: Primer 26

<400> SEQUENCE: 37
ctcctcgcga ggaaccaact                                               20

<210> SEQ ID NO 38
<211> LENGTH: 616
<212> TYPE: PRT
<213> ORGANISM: Artificial Sequence
<220> FEATURE:
<223> OTHER INFORMATION: L138G, P247C, R558H, G561D

<400> SEQUENCE: 38

Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Gly Val Gln Ala Arg Glu His
    130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Ser Pro Glu Ser Phe Thr Gly Thr Glu Val Glu Tyr Ala Lys
    210                 215                 220

Glu Val Val Asp Ala Val Val Glu Val Met Asp Pro Thr Pro Glu Asn
225                 230                 235                 240

Pro Met Ile Ile Asn Leu Cys Ser Thr Val Glu Met Ile Thr Pro Asn
                245                 250                 255

Val Tyr Ala Asp Ser Ile Glu Trp Met His Arg Asn Leu Asn Arg Arg
            260                 265                 270

Asp Ser Ile Ile Leu Ser Leu His Pro His Asn Asp Arg Gly Thr Gly
        275                 280                 285

Val Gly Ala Ala Glu Leu Gly Tyr Met Ala Gly Ala Asp Arg Ile Glu
    290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
            340                 345                 350

Leu Arg Val Pro Glu Arg His Pro Tyr Gly Gly Asp Leu Val Phe Thr
        355                 360                 365

Ala Phe Ser Gly Ser His Gln Asp Ala Val Asn Lys Gly Leu Asp Ala
370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
            420                 425                 430

Gln Ser Gly Lys Gly Gly Val Ala Tyr Ile Met Lys Thr Asp His Gly
        435                 440                 445

Leu Gln Ile Pro Arg Ser Met Gln Val Glu Phe Ser Thr Val Val Gln
    450                 455                 460

Asn Val Thr Asp Ala Glu Gly Gly Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
            500                 505                 510

Ile Thr Ala Glu Leu Ile His Asn Gly Lys Asp Val Thr Val Asp Gly
        515                 520                 525

Arg Gly Asn Gly Pro Leu Ala Ala Tyr Ala Asn Ala Leu Glu Lys Leu
    530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
        595                 600                 605

Glu Ala Val Leu Ala Gly Gly Val
    610                 615

<210> SEQ ID NO 39
<211> LENGTH: 1851
<212> TYPE: DNA
<213> ORGANISM: Artificial Sequence
<220> FEATURE:
<223> OTHER INFORMATION: L138G, P247C, R558H, G561D

<400> SEQUENCE: 39
atgtctccta acgatgcatt catctccgca cctgccaaga tcgaaacccc agttgggcct    60
cgcaatgaag gccagccagc atggaataag cagcgtggct cctcaatgcc agttaaccgc   120
tacatgcctt tcgaggttga ggtagaagat atttctctgc cggaccgcac ttggccagat   180
aaaaaaatca ccgttgcacc tcagtggtgt gctgttgacc tgcgtgacgg caaccaggct   240

```
ctgattgatc cgatgtctcc tgagcgtaag cgccgcatgt ttgagctgct ggttcagatg      300
ggattcaagg aaatcgaggt cggtttccct tcagcttccc agactgattt tgatttcgtt      360
cgtgagatca tcgaaaagga catgatccct gacgatgtca ccattcaggt tggggttcag      420
gctcgtgagc acctgattcg ccgtactttt gaagcttgcg aaggcgcaaa aaacgttatc      480
gtgcacttct acaactcaac ctccatcctg cagcgcaacg tggtgttccg catggacaag      540
gtgcaggtga agaagctggc taccgatgcc gctgaactga tcaagaccgt cgctcaggat      600
tacccagaca ccaactggcg ctggcagtac tcccctgagt ccttcaccgg cactgaggtt      660
gagtacgcca aggaagttgt ggacgcagtt gttgaggtca tggatccaac tcctgagaac      720
ccaatgatca tcaacctgtg ttccaccgtt gagatgatca cccctaacgt ttacgcagac      780
tccattgaat ggatgcaccg caatctaaac cgtcgtgatt ccattatcct gtccctgcac      840
ccgcacaatg accgtggcac cggcgttggc gcagctgagc tgggctacat ggctggcgct      900
gaccgcatcg aaggctgcct gttcggcaac ggcgagcgca ccggcaacgt ctgcctggtc      960
accctggcac tgaacatgct gacccagggc gttgaccctc agctggactt caccgatata     1020
cgccagatcc gcagcaccgt tgaatactgc aaccagctgc gcgttcctga gcgccaccca     1080
tacggcggcg acctggtctt caccgctttc tccggttccc accaggacgc tgtgaacaag     1140
ggtctggacg ccatggctgc caaggttcag ccaggtgcta gctccactga gtttcttgg     1200 gagcagctgc gcgacaccga atgggaggtt ccttacctgc ctatcgatcc aaaggatgtc     1260
ggtcgcgact acgaggctgt tatccgcgtg aactcccagt ccggcaaggg cggcgttgct     1320
tacatcatga gaccgatca cggtctgcag atccctcgct ccatgcaggt tgagttctcc     1380
accgttgtcc agaacgtcac cgacgctgag ggcggcgagg tcaactccaa ggcaatgtgg     1440
gatatcttcg ccaccgagta cctggagcgc accgcaccag ttgagcagat cgcgctgcgc     1500
gtcgagaacg ctcagaccga aaacgaggat gcatccatca ccgccgagct catccacaac     1560
ggcaaggacg tcaccgtcga tggccacggc aacggcccac tggctgctta cgccaacgcg     1620
ctggagaagc tgggcatcga cgttgagatc caggaataca accagcacgc ccacacctcg     1680
gatgacgatg cagaagcagc cgcctacgtg ctggctgagg tcaacggccg caaggtctgg     1740
ggcgtcggca tcgctggctc catcacctac gcttcgctga aggcagtgac ctccgccgta     1800
aaccgcgcgc tggacgtcaa ccacgaggca gtcctggctg gcggcgttta a               1851
```

<210> SEQ ID NO 40
<211> LENGTH: 616
<212> TYPE: PRT
<213> ORGANISM: Artificial Sequence
<220> FEATURE:
<223> OTHER INFORMATION: H162E, P247C, R558H, G561D

<400> SEQUENCE: 40

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60

Val Ala Pro Gln Trp Cys Ala Val Asp Leu Arg Asp Gly Asn Gln Ala
65                  70                  75                  80
```

```
Leu Ile Asp Pro Met Ser Pro Glu Arg Lys Arg Met Phe Glu Leu
                85                  90                  95
Leu Val Gln Met Gly Phe Lys Glu Ile Glu Val Gly Phe Pro Ser Ala
        100                 105                 110
Ser Gln Thr Asp Phe Asp Phe Val Arg Glu Ile Ile Glu Lys Gly Met
        115                 120                 125
Ile Pro Asp Asp Val Thr Ile Gln Val Leu Val Gln Ala Arg Glu His
        130                 135                 140
Leu Ile Arg Arg Thr Phe Glu Ala Cys Glu Gly Ala Lys Asn Val Ile
145                 150                 155                 160
Val Glu Phe Tyr Asn Ser Thr Ser Ile Leu Gln Arg Asn Val Val Phe
                165                 170                 175
Arg Met Asp Lys Val Gln Val Lys Lys Leu Ala Thr Asp Ala Ala Glu
        180                 185                 190
Leu Ile Lys Thr Ile Ala Gln Asp Tyr Pro Asp Thr Asn Trp Arg Trp
        195                 200                 205
Gln Tyr Ser Pro Glu Ser Phe Thr Gly Thr Glu Val Glu Tyr Ala Lys
        210                 215                 220
Glu Val Val Asp Ala Val Val Glu Val Met Asp Pro Thr Pro Glu Asn
225                 230                 235                 240
Pro Met Ile Ile Asn Leu Cys Ser Thr Val Glu Met Ile Thr Pro Asn
                245                 250                 255
Val Tyr Ala Asp Ser Ile Glu Trp Met His Arg Asn Leu Asn Arg Arg
                260                 265                 270
Asp Ser Ile Ile Leu Ser Leu His Pro His Asn Asp Arg Gly Thr Gly
        275                 280                 285
Val Gly Ala Ala Glu Leu Gly Tyr Met Ala Gly Ala Asp Arg Ile Glu
        290                 295                 300
Gly Cys Leu Phe Gly Asn Gly Glu Arg Thr Gly Asn Val Cys Leu Val
305                 310                 315                 320
Thr Leu Ala Leu Asn Met Leu Thr Gln Gly Val Asp Pro Gln Leu Asp
                325                 330                 335
Phe Thr Asp Ile Arg Gln Ile Arg Ser Thr Val Glu Tyr Cys Asn Gln
                340                 345                 350
Leu Arg Val Pro Glu Arg His Pro Tyr Gly Gly Asp Leu Val Phe Thr
        355                 360                 365
Ala Phe Ser Gly Ser His Gln Asp Ala Val Asn Lys Gly Leu Asp Ala
        370                 375                 380
Met Ala Ala Lys Val Gln Pro Gly Ala Ser Ser Thr Glu Val Ser Trp
385                 390                 395                 400
Glu Gln Leu Arg Asp Thr Glu Trp Glu Val Pro Tyr Leu Pro Ile Asp
                405                 410                 415
Pro Lys Asp Val Gly Arg Asp Tyr Glu Ala Val Ile Arg Val Asn Ser
        420                 425                 430
Gln Ser Gly Lys Gly Gly Val Ala Tyr Ile Met Lys Thr Asp His Gly
        435                 440                 445
Leu Gln Ile Pro Arg Ser Met Gln Val Glu Phe Ser Thr Val Val Gln
        450                 455                 460
Asn Val Thr Asp Ala Glu Gly Gly Glu Val Asn Ser Lys Ala Met Trp
465                 470                 475                 480
Asp Ile Phe Ala Thr Glu Tyr Leu Glu Arg Thr Ala Pro Val Glu Gln
                485                 490                 495
Ile Ala Leu Arg Val Glu Asn Ala Gln Thr Glu Asn Glu Asp Ala Ser
```

500             505             510
Ile Thr Ala Glu Leu Ile His Asn Gly Lys Asp Val Thr Val Asp Gly
            515                 520                 525

Arg Gly Asn Gly Pro Leu Ala Ala Tyr Ala Asn Ala Leu Glu Lys Leu
        530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
        580                 585                 590

Leu Lys Ala Val Thr Ser Ala Val Asn Arg Ala Leu Asp Val Asn His
            595                 600                 605

Glu Ala Val Leu Ala Gly Gly Val
        610                 615

<210> SEQ ID NO 41
<211> LENGTH: 1851
<212> TYPE: DNA
<213> ORGANISM: Artificial Sequence
<220> FEATURE:
<223> OTHER INFORMATION: H162E, P247C, R558H, G561D

<400> SEQUENCE: 41

| | |
|---|---:|
| atgtctccta acgatgcatt catctccgca cctgccaaga tcgaaacccc agttgggcct | 60 |
| cgcaatgaag gccagccagc atggaataag cagcgtggct cctcaatgcc agttaaccgc | 120 |
| tacatgcctt tcgaggttga ggtagaagat atttctctgc cggaccgcac ttggccagat | 180 |
| aaaaaaatca ccgttgcacc tcagtggtgt gctgttgacc tgcgtgacgg caaccaggct | 240 |
| ctgattgatc cgatgtctcc tgagcgtaag cgccgcatgt ttgagctgct ggttcagatg | 300 |
| ggattcaagg aaatcgaggt cggtttccct tcagcttccc agactgattt tgatttcgtt | 360 |
| cgtgagatca tcgaaaagga catgatccct gacgatgtca ccattcaggt tctggttcag | 420 |
| gctcgtgagc cctgattcg ccgtactttt gaagcttgcg aaggcgcaaa aaacgttatc | 480 |
| gtggagttct acaactcaac ctccatcctg cagcgcaacg tggtgttccg catggacaag | 540 |
| gtgcaggtga agaagctggc taccgatgcc gctgaactga tcaagaccgt cgctcaggat | 600 |
| tacccagaca ccaactggcg ctggcagtac tcccctgagt ccttcaccgg cactgaggtt | 660 |
| gagtacgcca aggaagttgt ggacgcagtt gttgaggtca tggatccaac tcctgagaac | 720 |
| ccaatgatca tcaacctgtg ttccaccgtt gagatgatca cccctaacgt ttacgcagac | 780 |
| tccattgaat ggatgcaccg caatctaaac cgtcgtgatt ccattatcct gtccctgcac | 840 |
| ccgcacaatg accgtggcac cggcgttggc gcagctgagc tgggctacat ggctggcgct | 900 |
| gaccgcatcg aaggctgcct gttcggcaac ggcgagcgca ccggcaacgt ctgcctggtc | 960 |
| accctggcac tgaacatgct gacccagggc gttgaccctc agctggactt caccgatata | 1020 |
| cgccagatcc gcagcaccgt tgaatactgc aaccagctgc gcgttcctga gcgccaccca | 1080 |
| tacggcggcg acctggtctt caccgctttc tccggttccc accaggacgc tgtgaacaag | 1140 |
| ggtctggacg ccatggctgc caaggttcag ccaggtgcta gctccactga gtttcttgg | 1200 |
| gagcagctgc gcgacaccga atgggaggtt ccttacctgc ctatcgatcc aaaggatgtc | 1260 |
| ggtcgcgact acgaggctgt tatccgcgtg aactcccagt ccggcaaggg cggcgttgct | 1320 |
| tacatcatga agaccgatca cggtctgcag atccctcgct ccatgcaggt tgagttctcc | 1380 |

-continued

```
accgttgtcc agaacgtcac cgacgctgag ggcggcgagg tcaactccaa ggcaatgtgg    1440
gatatcttcg ccaccgagta cctggagcgc accgcaccag ttgagcagat cgcgctgcgc    1500
gtcgagaacg ctcagaccga aaacgaggat gcatccatca ccgccgagct catccacaac    1560
ggcaaggacg tcaccgtcga tggccacggc aacggcccac tggctgctta cgccaacgcg    1620
ctggagaagc tgggcatcga cgttgagatc caggaataca accagcacgc ccacacctcg    1680
gatgacgatg cagaagcagc cgcctacgtg ctggctgagg tcaacggccg caaggtctgg    1740
ggcgtcggca tcgctggctc catcacctac gcttcgctga aggcagtgac ctccgccgta    1800
aaccgcgcgc tggacgtcaa ccacgaggca gtcctggctg cggcgtttta a             1851
```

<210> SEQ ID NO 42
<211> LENGTH: 616
<212> TYPE: PRT
<213> ORGANISM: Artificial Sequence
<220> FEATURE:
<223> OTHER INFORMATION: S211L, P247C, R558H, G561D

<400> SEQUENCE: 42

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Leu Val Gln Ala Arg Glu His
    130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Leu Pro Glu Ser Phe Thr Gly Thr Glu Val Glu Tyr Ala Lys
    210                 215                 220

Glu Val Val Asp Ala Val Val Glu Val Met Asp Pro Thr Pro Glu Asn
225                 230                 235                 240

Pro Met Ile Ile Asn Leu Cys Ser Thr Val Glu Met Ile Thr Pro Asn
                245                 250                 255

Val Tyr Ala Asp Ser Ile Glu Trp Met His Arg Asn Leu Asn Arg Arg
            260                 265                 270

Asp Ser Ile Ile Leu Ser Leu His Pro His Asn Asp Arg Gly Thr Gly
        275                 280                 285
```

Val Gly Ala Ala Glu Leu Gly Tyr Met Ala Gly Ala Asp Arg Ile Glu
            290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
            340                 345                 350

Leu Arg Val Pro Glu Arg His Pro Tyr Gly Gly Asp Leu Val Phe Thr
        355                 360                 365

Ala Phe Ser Gly Ser His Gln Asp Ala Val Asn Lys Gly Leu Asp Ala
    370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
            420                 425                 430

Gln Ser Gly Lys Gly Gly Val Ala Tyr Ile Met Lys Thr Asp His Gly
        435                 440                 445

Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
            500                 505                 510

Ile Thr Ala Glu Leu Ile His Asn Gly Lys Asp Val Thr Val Asp Gly
        515                 520                 525

Arg Gly Asn Gly Pro Leu Ala Ala Tyr Ala Asn Ala Leu Glu Lys Leu
    530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
        595                 600                 605

Glu Ala Val Leu Ala Gly Gly Val
    610                 615

<210> SEQ ID NO 43
<211> LENGTH: 1851
<212> TYPE: DNA
<213> ORGANISM: Artificial Sequence
<220> FEATURE:
<223> OTHER INFORMATION: S211L, P247C, R558H, G561D

<400> SEQUENCE: 43
atgtctccta acgatgcatt catctccgca cctgccaaga tcgaaacccc agttgggcct     60
cgcaatgaag ccagccagc atggaataag cagcgtggct cctcaatgcc agttaaccgc    120
tacatgcctt tcgaggttga ggtagaagat atttctctgc cggaccgcac ttggccagat    180

```
aaaaaaatca ccgttgcacc tcagtggtgt gctgttgacc tgcgtgacgg caaccaggct    240
ctgattgatc cgatgtctcc tgagcgtaag cgccgcatgt ttgagctgct ggttcagatg    300
ggattcaagg aaatcgaggt cggtttccct tcagcttccc agactgattt tgatttcgtt    360
cgtgagatca tcgaaaagga catgatccct gacgatgtca ccattcaggt tctggttcag    420
gctcgtgagc acctgattcg ccgtactttt gaagcttgcg aaggcgcaaa aaacgttatc    480
gtgcacttct acaactcaac ctccatcctg cagcgcaacg tggtgttccg catggacaag    540
gtgcaggtga agaagctggc taccgatgcc gctgaactga tcaagaccgt cgctcaggat    600
tacccagaca ccaactggcg ctggcagtac cttcctgagt ccttcaccgg cactgaggtt    660
gagtacgcca aggaagttgt ggacgcagtt gttgaggtca tggatccaac tcctgagaac    720
ccaatgatca tcaacctgtg ttccaccgtt gagatgatca cccctaacgt ttacgcagac    780
tccattgaat ggatgcaccg caatctaaac cgtcgtgatt ccattatcct gtccctgcac    840
ccgcacaatg accgtggcac cggcgttggc gcagctgagc tgggctacat ggctggcgct    900
gaccgcatcg aaggctgcct gttcggcaac ggcgagcgca ccggcaacgt ctgcctggtc    960
accctggcac tgaacatgct gacccagggc gttgaccctc agctggactt caccgatata   1020
cgccagatcc gcagcaccgt tgaatactgc aaccagctgc gcgttcctga gcgccaccca   1080 tacgcggcg acctggtctt caccgctttc tccggttccc accaggacgc tgtgaacaag   1140
ggtctggacg ccatggctgc caaggttcag ccaggtgcta gctccactga gtttcttgg   1200 gagcagctgc gcgacaccga atgggaggtt ccttacctgc ctatcgatcc aaaggatgtc   1260
ggtcgcgact acgaggctgt tatccgcgtg aactcccagt ccggcaaggg cggcgttgct   1320
tacatcatga agaccgatca cggtctgcag atccctcgct ccatgcaggt tgagttctcc   1380
accgttgtcc agaacgtcac cgacgctgag ggcggcgagg tcaactccaa ggcaatgtgg   1440
gatatcttcg ccaccgagta cctggagcgc accgcaccag ttgagcagat cgcgctgcgc   1500
gtcgagaacg ctcagaccga aaacgaggat gcatccatca ccgccgagct catccacaac   1560
ggcaaggacg tcaccgtcga tggccacggc aacggcccac tggctgctta cgccaacgcg   1620
ctggagaagc tgggcatcga cgttgagatc caggaataca accagcacgc ccacacctcg   1680
gatgacgatg cagaagcagc cgcctacgtg ctggctgagg tcaacggccg caaggtctgg   1740
ggcgtcggca tcgctggctc catcacctac gcttcgctga aggcagtgac ctccgccgta   1800
aaccgcgcgc tggacgtcaa ccacgaggca gtcctggctg gcggcgttta a            1851
```

<210> SEQ ID NO 44
<211> LENGTH: 616
<212> TYPE: PRT
<213> ORGANISM: Artificial Sequence
<220> FEATURE:
<223> OTHER INFORMATION: N245S, P247C, R558H, G561D

<400> SEQUENCE: 44

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60
```

```
Val Ala Pro Gln Trp Cys Ala Val Asp Leu Arg Asp Gly Asn Gln Ala
 65                  70                  75                  80

Leu Ile Asp Pro Met Ser Pro Glu Arg Lys Arg Met Phe Glu Leu
                 85                  90                  95

Leu Val Gln Met Gly Phe Lys Glu Ile Glu Val Gly Phe Pro Ser Ala
                100                 105                 110

Ser Gln Thr Asp Phe Asp Phe Val Arg Glu Ile Ile Glu Lys Gly Met
            115                 120                 125

Ile Pro Asp Asp Val Thr Ile Gln Val Leu Val Gln Ala Arg Glu His
        130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
                180                 185                 190

Leu Ile Lys Thr Ile Ala Gln Asp Tyr Pro Asp Thr Asn Trp Arg Trp
            195                 200                 205

Gln Tyr Ser Pro Glu Ser Phe Thr Gly Thr Glu Val Glu Tyr Ala Lys
        210                 215                 220

Glu Val Val Asp Ala Val Val Glu Val Met Asp Pro Thr Pro Glu Asn
225                 230                 235                 240

Pro Met Ile Ile Ser Leu Cys Ser Thr Val Glu Met Ile Thr Pro Asn
                245                 250                 255

Val Tyr Ala Asp Ser Ile Glu Trp Met His Arg Asn Leu Asn Arg Arg
                260                 265                 270

Asp Ser Ile Ile Leu Ser Leu His Pro His Asn Asp Arg Gly Thr Gly
            275                 280                 285

Val Gly Ala Ala Glu Leu Gly Tyr Met Ala Gly Ala Asp Arg Ile Glu
        290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
                340                 345                 350

Leu Arg Val Pro Glu Arg His Pro Tyr Gly Gly Asp Leu Val Phe Thr
            355                 360                 365

Ala Phe Ser Gly Ser His Gln Asp Ala Val Asn Lys Gly Leu Asp Ala
        370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
                420                 425                 430

Gln Ser Gly Lys Gly Val Ala Tyr Ile Met Lys Thr Asp His Gly
            435                 440                 445

Leu Gln Ile Pro Arg Ser Met Gln Val Glu Phe Ser Thr Val Val Gln
        450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
```

```
            485                 490                 495
Ile Ala Leu Arg Val Glu Asn Ala Gln Thr Glu Asn Glu Asp Ala Ser
                500                 505                 510

Ile Thr Ala Glu Leu Ile His Asn Gly Lys Asp Val Thr Val Asp Gly
                515                 520                 525

Arg Gly Asn Gly Pro Leu Ala Ala Tyr Ala Asn Ala Leu Glu Lys Leu
                530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
                580                 585                 590

Leu Lys Ala Val Thr Ser Ala Val Asn Arg Ala Leu Asp Val Asn His
                595                 600                 605

Glu Ala Val Leu Ala Gly Gly Val
                610                 615

<210> SEQ ID NO 45
<211> LENGTH: 1851
<212> TYPE: DNA
<213> ORGANISM: Artificial Sequence
<220> FEATURE:
<223> OTHER INFORMATION: N245S, P247C, R558H, G561D

<400> SEQUENCE: 45
atgtctccta cgatgcatt catctccgca cctgccaaga tcgaaacccc agttgggcct        60
cgcaatgaag gccagccagc atggaataag cagcgtggct cctcaatgcc agttaaccgc      120
tacatgcctt tcgaggttga ggtagaagat atttctctgc cggaccgcac ttggccagat      180
aaaaaaatca ccgttgcacc tcagtggtgt gctgttgacc tgcgtgacgg caaccaggct      240
ctgattgatc cgatgtctcc tgagcgtaag cgccgcatgt ttgagctgct ggttcagatg      300
ggattcaagg aaatcgaggt cggtttccct tcagcttccc agactgattt tgatttcgtt      360
cgtgagatca tcgaaaagga catgatccct gacgatgtca ccattcaggt tctggttcag      420
gctcgtgagc acctgattcg ccgtactttt gaagcttgcg aaggcgcaaa aaacgttatc      480
gtgcacttct acaactcaac ctccatcctg cagcgcaacg tggtgttccg catggacaag      540
gtgcaggtga agaagctggc taccgatgcc gctgaactga tcaagaccgt cgctcaggat      600
tacccagaca ccaactggcg ctggcagtac tcccctgagt ccttcaccgg cactgaggtt      660
gagtacgcca aggaagttgt ggacgcagtt gttgaggtca tggatccaac tcctgagaac      720
ccaatgatca tctccctgtg ttccaccgtt gagatgatca cccctaacgt ttacgcagac      780
tccattgaat ggatgcaccg caatctaaac cgtcgtgatt ccattatcct gtccctgcac      840
ccgcacaatg accgtggcac cggcgttggc gcagctgagc tgggctacat ggctggcgct      900
gaccgcatcg aaggctgcct gttcggcaac ggcgagcgca ccggcaacgt ctgcctggtc      960
accctggcac tgaacatgct gacccagggc gttgaccctc agctggactt caccgatata     1020
cgccagatcc gcagcaccgt tgaatactgc aaccagctgc gcgttcctga cgccaccca      1080 tacggcggcg acctggtctt caccgctttc tccggttccc accaggacgc tgtgaacaag     1140
ggtctggacg ccatggctgc caaggttcag ccaggtgcta gctccactga gtttcttgg      1200 gagcagctgc gcgacaccga atgggaggtt cccttacctgc ctatcgatcc aaaggatgtc     1260
ggtcgcgact acgaggctgt tatccgcgtg aactcccagt ccggcaaggg cggcgttgct     1320
```

```
tacatcatga agaccgatca cggtctgcag atccctcgct ccatgcaggt tgagttctcc   1380
accgttgtcc agaacgtcac cgacgctgag ggcggcgagg tcaactccaa ggcaatgtgg   1440
gatatcttcg ccaccgagta cctggagcgc accgcaccag ttgagcagat cgcgctgcgc   1500
gtcgagaacg ctcagaccga aaacgaggat gcatccatca ccgccgagct catccacaac   1560
ggcaaggacg tcaccgtcga tggccacggc aacggcccac tggctgctta cgccaacgcg   1620
ctggagaagc tgggcatcga cgttgagatc caggaataca accagcacgc ccacacctcg   1680
gatgacgatg cagaagcagc cgcctacgtg ctggctgagg tcaacggccg caaggtctgg   1740
ggcgtcggca tcgctggctc catcacctac gcttcgctga aggcagtgac ctccgccgta   1800
aaccgcgcgc tggacgtcaa ccacgaggca gtcctggctg gcggcgttta a            1851
```

<210> SEQ ID NO 46
<211> LENGTH: 616
<212> TYPE: PRT
<213> ORGANISM: Artificial Sequence
<220> FEATURE:
<223> OTHER INFORMATION: I588P, P247C, R558H, G561D

<400> SEQUENCE: 46

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Leu Val Gln Ala Arg Glu His
    130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Ser Pro Glu Ser Phe Thr Gly Thr Glu Val Glu Tyr Ala Lys
    210                 215                 220

Glu Val Val Asp Ala Val Val Glu Val Met Asp Pro Thr Pro Glu Asn
225                 230                 235                 240

Pro Met Ile Ile Asn Leu Cys Ser Thr Val Glu Met Ile Thr Pro Asn
                245                 250                 255

Val Tyr Ala Asp Ser Ile Glu Trp Met His Arg Asn Leu Asn Arg Arg
            260                 265                 270
```

Asp Ser Ile Ile Leu Ser Leu His Pro His Asn Asp Arg Gly Thr Gly
    275                 280                 285

Val Gly Ala Ala Glu Leu Gly Tyr Met Ala Gly Ala Asp Arg Ile Glu
    290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
                    340                 345                 350

Leu Arg Val Pro Glu Arg His Pro Tyr Gly Gly Asp Leu Val Phe Thr
                355                 360                 365

Ala Phe Ser Gly Ser His Gln Asp Ala Val Asn Lys Gly Leu Asp Ala
    370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
                    420                 425                 430

Gln Ser Gly Lys Gly Gly Val Ala Tyr Ile Met Lys Thr Asp His Gly
                435                 440                 445

Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
                    500                 505                 510

Ile Thr Ala Glu Leu Ile His Asn Gly Lys Asp Val Thr Val Asp Gly
                515                 520                 525

Arg Gly Asn Gly Pro Leu Ala Ala Tyr Ala Asn Ala Leu Glu Lys Leu
    530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Pro Thr Tyr Ala Ser
                    580                 585                 590

Leu Lys Ala Val Thr Ser Ala Val Asn Arg Ala Leu Asp Val Asn His
                595                 600                 605

Glu Ala Val Leu Ala Gly Gly Val
    610                 615

<210> SEQ ID NO 47
<211> LENGTH: 1851
<212> TYPE: DNA
<213> ORGANISM: Artificial Sequence
<220> FEATURE:
<223> OTHER INFORMATION: I588P, P247C, R558H, G561D

<400> SEQUENCE: 47
atgtctccta acgatgcatt catctccgca cctgccaaga tcgaaacccc agttgggcct     60

-continued

| | |
|---|---|
| cgcaatgaag gccagccagc atggaataag cagcgtggct cctcaatgcc agttaaccgc | 120 |
| tacatgcctt tcgaggttga ggtagaagat atttctctgc cggaccgcac ttggccagat | 180 |
| aaaaaaatca ccgttgcacc tcagtggtgt gctgttgacc tgcgtgacgg caaccaggct | 240 |
| ctgattgatc cgatgtctcc tgagcgtaag cgccgcatgt ttgagctgct ggttcagatg | 300 |
| ggattcaagg aaatcgaggt cggtttccct tcagcttccc agactgattt tgatttcgtt | 360 |
| cgtgagatca tcgaaaagga catgatccct gacgatgtca ccattcaggt tctggttcag | 420 |
| gctcgtgagc acctgattcg ccgtactttt gaagcttgcg aaggcgcaaa aaacgttatc | 480 |
| gtgcacttct acaactcaac ctccatcctg cagcgcaacg tggtgttccg catggacaag | 540 |
| gtgcaggtga agaagctggc taccgatgcc gctgaactga tcaagaccgt cgctcaggat | 600 |
| tacccagaca ccaactggcg ctggcagtac tcccctgagt ccttcaccgg cactgaggtt | 660 |
| gagtacgcca aggaagttgt ggacgcagtt gttgaggtca tggatccaac tcctgagaac | 720 |
| ccaatgatca tcaacctgtg ttccaccgtt gagatgatca cccctaacgt ttacgcagac | 780 |
| tccattgaat ggatgcaccg caatctaaac cgtcgtgatt ccattatcct gtccctgcac | 840 |
| ccgcacaatg accgtggcac cggcgttggc gcagctgagc tgggctacat ggctggcgct | 900 |
| gaccgcatcg aaggctgcct gttcggcaac ggcgagcgca ccggcaacgt ctgcctggtc | 960 |
| accctggcac tgaacatgct gacccagggc gttgaccctc agctggactt caccgatata | 1020 |
| cgccagatcc gcagcaccgt tgaatactgc aaccagctgc gcgttcctga gcgccaccca | 1080 |
| tacggcggcg acctggtctt caccgctttc tccggttccc accaggacgc tgtgaacaag | 1140 |
| ggtctggacg ccatggctgc caaggttcag ccaggtgcta gctccactga gtttcttgg | 1200 |
| gagcagctgc gcgacaccga atgggaggtt ccttacctgc ctatcgatcc aaaggatgtc | 1260 |
| ggtcgcgact acgaggctgt tatccgcgtg aactcccagt ccggcaaggg cggcgttgct | 1320 |
| tacatcatga agaccgatca cggtctgcag atccctcgct ccatgcaggt tgagttctcc | 1380 |
| accgttgtcc agaacgtcac cgacgctgag ggcggcgagg tcaactccaa ggcaatgtgg | 1440 |
| gatatcttcg ccaccgagta cctggagcgc accgcaccag ttgagcagat cgcgctgcgc | 1500 |
| gtcgagaacg ctcagaccga aaacgaggat gcatccatca ccgccgagct catccacaac | 1560 |
| ggcaaggacg tcaccgtcga tggccacggc aacggcccac tggctgctta cgccaacgcg | 1620 |
| ctggagaagc tgggcatcga cgttgagatc caggaataca accagcacgc ccacacctcg | 1680 |
| gatgacgatg cagaagcagc cgcctacgtg ctggctgagg tcaacggccg caaggtctgg | 1740 |
| ggcgtcggca tcgctggctc ccccacctac gcttcgctga aggcagtgac ctccgccgta | 1800 |
| aaccgcgcgc tggacgtcaa ccacgaggca gtcctggctg gcggcgttta a | 1851 |

<210> SEQ ID NO 48
<211> LENGTH: 616
<212> TYPE: PRT
<213> ORGANISM: Artificial Sequence
<220> FEATURE:
<223> OTHER INFORMATION: S211L, P247C, R558H, G561D, I588P

<400> SEQUENCE: 48

Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

```
Glu Asp Ile Ser Leu Pro Asp Arg Thr Trp Pro Asp Lys Lys Ile Thr
     50                  55                  60

Val Ala Pro Gln Trp Cys Ala Val Asp Leu Arg Asp Gly Asn Gln Ala
 65              70                  75                      80

Leu Ile Asp Pro Met Ser Pro Glu Arg Lys Arg Met Phe Glu Leu
                 85                  90                  95

Leu Val Gln Met Gly Phe Lys Glu Ile Glu Val Gly Phe Pro Ser Ala
             100                 105                 110

Ser Gln Thr Asp Phe Asp Phe Val Arg Glu Ile Ile Glu Lys Gly Met
             115                 120                 125

Ile Pro Asp Asp Val Thr Ile Gln Val Leu Val Gln Ala Arg Glu His
             130                 135                 140

Leu Ile Arg Arg Thr Phe Glu Ala Cys Glu Gly Ala Lys Asn Val Ile
145                 150                 155                 160

Val His Phe Tyr Asn Ser Thr Ser Ile Leu Gln Arg Asn Val Val Phe
                 165                 170                 175

Arg Met Asp Lys Val Gln Val Lys Lys Leu Ala Thr Asp Ala Ala Glu
             180                 185                 190

Leu Ile Lys Thr Ile Ala Gln Asp Tyr Pro Asp Thr Asn Trp Arg Trp
             195                 200                 205

Gln Tyr Leu Pro Glu Ser Phe Thr Gly Thr Glu Val Glu Tyr Ala Lys
             210                 215                 220

Glu Val Val Asp Ala Val Glu Val Met Asp Pro Thr Pro Glu Asn
225                 230                 235                 240

Pro Met Ile Ile Asn Leu Cys Ser Thr Val Glu Met Ile Thr Pro Asn
                 245                 250                 255

Val Tyr Ala Asp Ser Ile Glu Trp Met His Arg Asn Leu Asn Arg Arg
             260                 265                 270

Asp Ser Ile Ile Leu Ser Leu His Pro His Asn Asp Arg Gly Thr Gly
             275                 280                 285

Val Gly Ala Ala Glu Leu Gly Tyr Met Ala Gly Ala Asp Arg Ile Glu
             290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                 325                 330                 335

Phe Thr Asp Ile Arg Gln Ile Arg Ser Thr Val Glu Tyr Cys Asn Gln
             340                 345                 350

Leu Arg Val Pro Glu Arg His Pro Tyr Gly Gly Asp Leu Val Phe Thr
             355                 360                 365

Ala Phe Ser Gly Ser His Gln Asp Ala Val Asn Lys Gly Leu Asp Ala
             370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                 405                 410                 415

Pro Lys Asp Val Gly Arg Asp Tyr Glu Ala Val Ile Arg Val Asn Ser
             420                 425                 430

Gln Ser Gly Lys Gly Gly Val Ala Tyr Ile Met Lys Thr Asp His Gly
             435                 440                 445

Leu Gln Ile Pro Arg Ser Met Gln Val Glu Phe Ser Thr Val Val Gln
             450                 455                 460

Asn Val Thr Asp Ala Glu Gly Gly Glu Val Asn Ser Lys Ala Met Trp
```

```
                465                 470                 475                 480
Asp Ile Phe Ala Thr Glu Tyr Leu Glu Arg Thr Ala Pro Val Glu Gln
                            485                 490                 495
Ile Ala Leu Arg Val Glu Asn Ala Gln Thr Glu Asn Glu Asp Ala Ser
                500                 505                 510
Ile Thr Ala Glu Leu Ile His Asn Gly Lys Asp Val Thr Val Asp Gly
                515                 520                 525
Arg Gly Asn Gly Pro Leu Ala Ala Tyr Ala Asn Ala Leu Glu Lys Leu
            530                 535                 540
Gly Ile Asp Val Glu Ile Gln Glu Tyr Asn Gln His Ala His Thr Ser
545                 550                 555                 560
Asp Asp Asp Ala Glu Ala Ala Tyr Val Leu Ala Glu Val Asn Gly
                565                 570                 575
Arg Lys Val Trp Gly Val Gly Ile Ala Gly Ser Pro Thr Tyr Ala Ser
            580                 585                 590
Leu Lys Ala Val Thr Ser Ala Val Asn Arg Ala Leu Asp Val Asn His
                595                 600                 605
Glu Ala Val Leu Ala Gly Gly Val
            610                 615

<210> SEQ ID NO 49
<211> LENGTH: 1851
<212> TYPE: DNA
<213> ORGANISM: Artificial Sequence
<220> FEATURE:
<223> OTHER INFORMATION: S211L,  P247C, R558H, G561D, I588P

<400> SEQUENCE: 49
atgtctccta acgatgcatt catctccgca cctgccaaga tcgaaacccc agttgggcct        60
cgcaatgaag gccagccagc atggaataag cagcgtggct cctcaatgcc agttaaccgc       120
tacatgcctt tcgaggttga ggtagaagat atttctctgc cggaccgcac ttggccagat       180
aaaaaaatca ccgttgcacc tcagtggtgt gctgttgacc tgcgtgacgg caaccaggct       240
ctgattgatc cgatgtctcc tgagcgtaag cgccgcatgt ttgagctgct ggttcagatg       300
ggattcaagg aaatcgaggt cggtttccct tcagcttccc agactgattt tgatttcgtt       360
cgtgagatca tcgaaaagga catgatccct gacgatgtca ccattcaggt tctggttcag       420
gctcgtgagc acctgattcg ccgtactttt gaagcttgcg aaggcgcaaa aaacgttatc       480
gtgcacttct acaactcaac ctccatcctg cagcgcaacg tggtgttccg catggacaag       540
gtgcaggtga agaagctggc taccgatgcc gctgaactga tcaagaccgt cgctcaggat       600
tacccagaca ccaactggcg ctggcagtac cttcctgagt ccttcaccgg cactgaggtt       660
gagtacgcca aggaagttgt ggacgcagtt gttgaggtca tggatccaac tcctgagaac       720
ccaatgatca tcaacctgtg ttccaccgtt gagatgatca cccctaacgt ttacgcagac       780
tccattgaat ggatgcaccg caatctaaac cgtcgtgatt ccattatcct gtccctgcac       840
ccgcacaatg accgtggcac cggcgttggc gcagctgagc tgggctacat ggctggcgct       900
gaccgcatcg aaggctgcct gttcggcaac ggcgagcgca ccgcaacgt ctgcctggtc       960 accctggcac tgaacatgct gacccagggc gttgaccctc agctggactt caccgatata      1020
cgccagatcc gcagcaccgt tgaatactgc aaccagctgc gcgttcctga gcgccaccca      1080 tacgcggcg acctggtctt caccgctttc tccggttccc accaggacgc tgtgaacaag      1140
ggtctggacg ccatggctgc caaggttcag ccaggtgcta gctccactga agtttcttgg      1200
```

```
gagcagctgc gcgacaccga atgggaggtt ccttacctgc ctatcgatcc aaaggatgtc   1260
ggtcgcgact acgaggctgt tatccgcgtg aactcccagt ccggcaaggg cggcgttgct   1320
tacatcatga agaccgatca cggtctgcag atccctcgct ccatgcaggt tgagttctcc   1380
accgttgtcc agaacgtcac cgacgctgag ggcggcgagg tcaactccaa ggcaatgtgg   1440
gatatcttcg ccaccgagta cctggagcgc accgcaccag ttgagcagat cgcgctgcgc   1500
gtcgagaacg ctcagaccga aaacgaggat gcatccatca ccgccgagct catccacaac   1560
ggcaaggacg tcaccgtcga tggccacggc aacggcccac tggctgctta cgccaacgcg   1620
ctggagaagc tgggcatcga cgttgagatc caggaataca accagcacgc ccacacctcg   1680
gatgacgatg cagaagcagc cgcctacgtg ctggctgagg tcaacggccg caaggtctgg   1740
ggcgtcggca tcgctggctc ccccacctac gcttcgctga aggcagtgac ctccgccgta   1800
aaccgcgcgc tggacgtcaa ccacgaggca gtcctggctg cggcgtttta a            1851
```

<210> SEQ ID NO 50
<211> LENGTH: 616
<212> TYPE: PRT
<213> ORGANISM: Artificial Sequence
<220> FEATURE:
<223> OTHER INFORMATION: L138G, H162E, S211L, N245S, P247C, R558H, G561D

<400> SEQUENCE: 50

```
Met Ser Pro Asn Asp Ala Phe Ile Ser Ala Pro Ala Lys Ile Glu Thr
1               5                   10                  15

Pro Val Gly Pro Arg Asn Glu Gly Gln Pro Ala Trp Asn Lys Gln Arg
            20                  25                  30

Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
    50                  55                  60

Val Ala Pro Gln Trp Cys Ala Val Asp Leu Arg Asp Gly Asn Gln Ala
65                  70                  75                  80

Leu Ile Asp Pro Met Ser Pro Glu Arg Lys Arg Arg Met Phe Glu Leu
                85                  90                  95

Leu Val Gln Met Gly Phe Lys Glu Ile Glu Val Gly Phe Pro Ser Ala
            100                 105                 110

Ser Gln Thr Asp Phe Asp Phe Val Arg Glu Ile Ile Glu Lys Gly Met
        115                 120                 125

Ile Pro Asp Asp Val Thr Ile Gln Val Gly Val Gln Ala Arg Glu His
    130                 135                 140

Leu Ile Arg Arg Thr Phe Glu Ala Cys Glu Gly Ala Lys Asn Val Ile
145                 150                 155                 160

Val Glu Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
            180                 185                 190

Leu Ile Lys Thr Ile Ala Gln Asp Tyr Pro Asp Thr Asn Trp Arg Trp
        195                 200                 205

Gln Tyr Leu Pro Glu Ser Phe Thr Gly Thr Val Glu Tyr Ala Lys
    210                 215                 220

Glu Val Val Asp Ala Val Val Glu Val Met Asp Pro Thr Pro Glu Asn
225                 230                 235                 240

Pro Met Ile Ile Ser Leu Cys Ser Thr Val Glu Met Ile Thr Pro Asn
                245                 250                 255
```

Val Tyr Ala Asp Ser Ile Glu Trp Met His Arg Asn Leu Asn Arg Arg
              260                 265                 270

Asp Ser Ile Ile Leu Ser Leu His Pro His Asn Asp Arg Gly Thr Gly
            275                 280                 285

Val Gly Ala Ala Glu Leu Gly Tyr Met Ala Gly Ala Asp Arg Ile Glu
        290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
            340                 345                 350

Leu Arg Val Pro Glu Arg His Pro Tyr Gly Gly Asp Leu Val Phe Thr
        355                 360                 365

Ala Phe Ser Gly Ser His Gln Asp Ala Val Asn Lys Gly Leu Asp Ala
370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
            420                 425                 430

Gln Ser Gly Lys Gly Val Ala Tyr Ile Met Lys Thr Asp His Gly
        435                 440                 445

Leu Gln Ile Pro Arg Ser Met Gln Val Glu Phe Ser Thr Val Val Gln
450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
            500                 505                 510

Ile Thr Ala Glu Leu Ile His Asn Gly Lys Asp Val Thr Val Asp Gly
        515                 520                 525

Arg Gly Asn Gly Pro Leu Ala Ala Tyr Ala Asn Ala Leu Glu Lys Leu
530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Ile Thr Tyr Ala Ser
            580                 585                 590

Leu Lys Ala Val Thr Ser Ala Val Asn Arg Ala Leu Asp Val Asn His
        595                 600                 605

Glu Ala Val Leu Ala Gly Gly Val
610                 615

<210> SEQ ID NO 51
<211> LENGTH: 1851
<212> TYPE: DNA
<213> ORGANISM: Artificial Sequence
<220> FEATURE:
<223> OTHER INFORMATION: L138G, H162E, S211L, N245S, P247C, R558H, G561D

<400> SEQUENCE: 51

-continued

```
atgtctccta acgatgcatt catctccgca cctgccaaga tcgaaacccc agttgggcct    60
cgcaatgaag gccagccagc atggaataag cagcgtggct cctcaatgcc agttaaccgc   120
tacatgcctt tcgaggttga ggtagaagat atttctctgc cggaccgcac ttggccagat   180
aaaaaaatca ccgttgcacc tcagtggtgt gctgttgacc tgcgtgacgg caaccaggct   240
ctgattgatc cgatgtctcc tgagcgtaag cgccgcatgt ttgagctgct ggttcagatg   300
ggattcaagg aaatcgaggt cggtttccct tcagcttccc agactgattt tgatttcgtt   360
cgtgagatca tcgaaaagga catgatccct gacgatgtca ccattcaggt tggggttcag   420
gctcgtgagc acctgattcg ccgtactttt gaagcttgcg aaggcgcaaa aacgttatc    480
gtggagttct acaactcaac ctccatcctg cagcgcaacg tggtgttccg catggacaag   540
gtgcaggtga agaagctggc taccgatgcc gctgaactga tcaagaccgt cgctcaggat   600
tacccagaca ccaactggcg ctggcagtac cttcctgagt ccttcaccgg cactgaggtt   660
gagtacgcca aggaagttgt ggacgcagtt gttgaggtca tggatccaac tcctgagaac   720
ccaatgatca tctccctgtg ttccaccgtt gagatgatca cccctaacgt ttacgcagac   780
tccattgaat ggatgcaccg caatctaaac cgtcgtgatt ccattatcct gtccctgcac   840
ccgcacaatg accgtggcac cggcgttggc gcagctgagc tgggctacat ggctggcgct   900
gaccgcatcg aaggctgcct gttcggcaac ggcgagcgca ccggcaacgt ctgcctggtc   960
accctggcac tgaacatgct gacccagggc gttgaccctc agctggactt caccgatata  1020
cgccagatcc gcagcaccgt tgaatactgc aaccagctgc gcgttcctga gcgccaccca  1080
tacggcggcg acctggtctt caccgctttc tccggttccc accaggacgc tgtgaacaag  1140
ggtctggacg ccatggctgc caaggttcag ccaggtgcta gctccactga gtttcttgg   1200
gagcagctgc gcgacaccga atgggaggtt ccttacctgc ctatcgatcc aaaggatgtc  1260
ggtcgcgact acgaggctgt tatccgcgtg aactcccagt ccggcaaggg cggcgttgct  1320
tacatcatga agaccgatca cggtctgcag atccctcgct ccatgcaggt tgagttctcc  1380
accgttgtcc agaacgtcac cgacgctgag ggcggcgagg tcaactccaa ggcaatgtgg  1440
gatatcttcg ccaccgagta cctggagcgc accgcaccag ttgagcagat cgcgctgcgc  1500
gtcgagaacg ctcagaccga aaacgaggat gcatccatca ccgccgagct catccacaac  1560
ggcaaggacg tcaccgtcga tggccacggc aacggcccac tggctgctta cgccaacgcg  1620
ctggagaagc tgggcatcga cgttgagatc caggaataca accagcacgc ccacacctcg  1680
gatgacgatg cagaagcagc cgcctacgtg ctggctgagg tcaacggccg caaggtctgg  1740
ggcgtcggca tcgctggctc catcacctac gcttcgctga aggcagtgac ctccgccgta  1800
aaccgcgcgc tggacgtcaa ccacgaggca gtcctggctg gcggcgttta a           1851
```

<210> SEQ ID NO 52
<211> LENGTH: 616
<212> TYPE: PRT
<213> ORGANISM: Artificial Sequence
<220> FEATURE:
<223> OTHER INFORMATION: L138G, H162E, S211L, N245S, P247C, R558H, G561D, I588P

<400> SEQUENCE: 52

```
Met Ser Pro Asn Asp Ala Phe Ile Ser Ala Pro Ala Lys Ile Glu Thr
 1               5                  10                  15

Pro Val Gly Pro Arg Asn Glu Gly Gln Pro Ala Trp Asn Lys Gln Arg
            20                  25                  30
```

-continued

```
Gly Ser Ser Met Pro Val Asn Arg Tyr Met Pro Phe Glu Val Glu Val
        35                  40                  45

Glu Asp Ile Ser Leu Pro Asp Arg Thr Trp Pro Asp Lys Lys Ile Thr
 50                  55                  60

Val Ala Pro Gln Trp Cys Ala Val Asp Leu Arg Asp Gly Asn Gln Ala
 65                  70                  75                  80

Leu Ile Asp Pro Met Ser Pro Glu Arg Lys Arg Met Phe Glu Leu
                     85                  90                  95

Leu Val Gln Met Gly Phe Lys Glu Ile Glu Val Gly Phe Pro Ser Ala
                100                 105                 110

Ser Gln Thr Asp Phe Asp Phe Val Arg Glu Ile Ile Glu Lys Gly Met
                115                 120                 125

Ile Pro Asp Asp Val Thr Ile Gln Val Gly Val Gln Ala Arg Glu His
                130                 135                 140

Leu Ile Arg Arg Thr Phe Glu Ala Cys Glu Gly Ala Lys Asn Val Ile
145                 150                 155                 160

Val Glu Phe Tyr Asn Ser Thr Ser Ile Leu Gln Arg Asn Val Val Phe
                165                 170                 175

Arg Met Asp Lys Val Gln Val Lys Lys Leu Ala Thr Asp Ala Ala Glu
                180                 185                 190

Leu Ile Lys Thr Ile Ala Gln Asp Tyr Pro Asp Thr Asn Trp Arg Trp
                195                 200                 205

Gln Tyr Leu Pro Glu Ser Phe Thr Gly Thr Glu Val Glu Tyr Ala Lys
                210                 215                 220

Glu Val Val Asp Ala Val Val Glu Val Met Asp Pro Thr Pro Glu Asn
225                 230                 235                 240

Pro Met Ile Ile Ser Leu Cys Ser Thr Val Glu Met Ile Thr Pro Asn
                245                 250                 255

Val Tyr Ala Asp Ser Ile Glu Trp Met His Arg Asn Leu Asn Arg Arg
                260                 265                 270

Asp Ser Ile Ile Leu Ser Leu His Pro His Asn Asp Arg Gly Thr Gly
                275                 280                 285

Val Gly Ala Ala Glu Leu Gly Tyr Met Ala Gly Ala Asp Arg Ile Glu
                290                 295                 300

Gly Cys Leu Phe Gly Asn Gly Glu Arg Thr Gly Asn Val Cys Leu Val
305                 310                 315                 320

Thr Leu Ala Leu Asn Met Leu Thr Gln Gly Val Asp Pro Gln Leu Asp
                325                 330                 335

Phe Thr Asp Ile Arg Gln Ile Arg Ser Thr Val Glu Tyr Cys Asn Gln
                340                 345                 350

Leu Arg Val Pro Glu Arg His Pro Tyr Gly Gly Asp Leu Val Phe Thr
                355                 360                 365

Ala Phe Ser Gly Ser His Gln Asp Ala Val Asn Lys Gly Leu Asp Ala
                370                 375                 380

Met Ala Ala Lys Val Gln Pro Gly Ala Ser Ser Thr Glu Val Ser Trp
385                 390                 395                 400

Glu Gln Leu Arg Asp Thr Glu Trp Glu Val Pro Tyr Leu Pro Ile Asp
                405                 410                 415

Pro Lys Asp Val Gly Arg Asp Tyr Glu Ala Val Ile Arg Val Asn Ser
                420                 425                 430

Gln Ser Gly Lys Gly Gly Val Ala Tyr Ile Met Lys Thr Asp His Gly
                435                 440                 445
```

```
Leu Gln Ile Pro Arg Ser Met Gln Val Glu Phe Ser Thr Val Val Gln
    450                 455                 460

Asn Val Thr Asp Ala Glu Gly Gly Glu Val Asn Ser Lys Ala Met Trp
465                 470                 475                 480

Asp Ile Phe Ala Thr Glu Tyr Leu Glu Arg Thr Ala Pro Val Glu Gln
                485                 490                 495

Ile Ala Leu Arg Val Glu Asn Ala Gln Thr Glu Asn Glu Asp Ala Ser
                500                 505                 510

Ile Thr Ala Glu Leu Ile His Asn Gly Lys Asp Val Thr Val Asp Gly
                515                 520                 525

Arg Gly Asn Gly Pro Leu Ala Ala Tyr Ala Asn Ala Leu Glu Lys Leu
530                 535                 540

Gly Ile Asp Val Glu Ile Gln Glu Tyr Asn Gln His Ala His Thr Ser
545                 550                 555                 560

Asp Asp Asp Ala Glu Ala Ala Tyr Val Leu Ala Glu Val Asn Gly
                565                 570                 575

Arg Lys Val Trp Gly Val Gly Ile Ala Gly Ser Pro Thr Tyr Ala Ser
                580                 585                 590

Leu Lys Ala Val Thr Ser Ala Val Asn Arg Ala Leu Asp Val Asn His
                595                 600                 605

Glu Ala Val Leu Ala Gly Gly Val
                610                 615

<210> SEQ ID NO 53
<211> LENGTH: 1851
<212> TYPE: DNA
<213> ORGANISM: Artificial Sequence
<220> FEATURE:
<223> OTHER INFORMATION: L138G, H162E, S211L, N245S, P247C, R558H,
      G561D, I588P

<400> SEQUENCE: 53
atgtctccta cgatgcatt catctccgca cctgccaaga tcgaaacccc agttgggcct      60
cgcaatgaag gccagccagc atggaataag cagcgtggct cctcaatgcc agttaaccgc     120
tacatgcctt tcgaggttga ggtagaagat atttctctgc cggaccgcac ttggccagat    180
aaaaaaatca ccgttgcacc tcagtggtgt gctgttgacc tgcgtgacgg caaccaggct    240
ctgattgatc cgatgtctcc tgagcgtaag cgccgcatgt ttgagctgct ggttcagatg    300
ggattcaagg aaatcgaggt cggtttccct tcagcttccc agactgattt tgatttcgtt    360
cgtgagatca tcgaaaagga catgatccct gacgatgtca ccattcaggt tggggttcag    420
gctcgtgagc acctgattcg ccgtactttt gaagcttgcg aaggcgcaaa aaacgttatc    480
gtggagttct acaactcaac ctccatcctg cagcgcaacg tggtgttccg catggacaag    540
gtgcaggtga agaagctggc taccgatgcc gctgaactga tcaagaccgt cgctcaggat    600
tacccagaca ccaactggcg ctggcagtac cttcctgagt ccttcaccgg cactgaggtt    660
gagtacgcca aggaagttgt ggacgcagtt gttgaggtca tggatccaac tcctgagaac    720
ccaatgatca tctccctgtg ttccaccgtt gagatgatca cccctaacgt ttacgcagac    780
tccattgaat ggatgcaccg caatctaaac cgtcgtgatt ccattatcct gtccctgcac    840
ccgcacaatg accgtggcac cggcgttggc gcagctgagc tgggctacat ggctggcgct    900
gaccgcatcg aaggctgcct gttcggcaac ggcgagcgca ccggcaacgt ctgcctggtc    960
accctggcac tgaacatgct gacccagggc gttgaccctc agctggactt caccgatata   1020
cgccagatcc gcagcaccgt tgaatactgc aaccagctgc gcgttcctga gcgccaccca   1080
```

```
tacggcggcg acctggtctt caccgctttc tccggttccc accaggacgc tgtgaacaag    1140
ggtctggacg ccatggctgc caaggttcag ccaggtgcta gctccactga agtttcttgg    1200
gagcagctgc gcgacaccga atgggaggtt ccttacctgc ctatcgatcc aaaggatgtc    1260
ggtcgcgact acgaggctgt tatccgcgtg aactcccagt ccggcaaggg cggcgttgct    1320
tacatcatga agaccgatca cggtctgcag atccctcgct ccatgcaggt tgagttctcc    1380
accgttgtcc agaacgtcac cgacgctgag ggcggcgagg tcaactccaa ggcaatgtgg    1440
gatatcttcg ccaccgagta cctggagcgc accgcaccag ttgagcagat cgcgctgcgc    1500
gtcgagaacg ctcagaccga aaacgaggat gcatccatca ccgccgagct catccacaac    1560
ggcaaggacg tcaccgtcga tggccacggc aacgcccac tggctgctta cgccaacgcg    1620
ctggagaagc tgggcatcga cgttgagatc caggaataca accagcacgc ccacacctcg    1680
gatgacgatg cagaagcagc cgcctacgtg ctggctgagg tcaacggccg caaggtctgg    1740
ggcgtcggca tcgctggctc ccccacctac gcttcgctga aggcagtgac ctccgccgta    1800
aaccgcgcgc tggacgtcaa ccacgaggca gtcctggctg gcggcgttta a             1851

<210> SEQ ID NO 54
<211> LENGTH: 45
<212> TYPE: DNA
<213> ORGANISM: Artificial Sequence
<220> FEATURE:
<223> OTHER INFORMATION: Primer 27

<400> SEQUENCE: 54
ggtgatcatc tcaacggtgg aacacaggtt gatgatcatt gggtt                      45

<210> SEQ ID NO 55
<211> LENGTH: 45
<212> TYPE: DNA
<213> ORGANISM: Artificial Sequence
<220> FEATURE:
<223> OTHER INFORMATION: Primer 28

<400> SEQUENCE: 55
aacccaatga tcatcaacct gtgttccacc gttgagatga tcacc                      45
```

ISOPROPYLMALATE SYNTHASE VARIANT AND A METHOD OF PRODUCING L-LEUCINE USING THE SAME

A computer readable text file, entitled "133660-04-9003-US_Sequence_Listing.txt," created on or about Aug. 8, 2023, with a file size of 120,573 bytes contains the sequence listing for this application and is hereby incorporated by reference in its entirety.

TECHNICAL FIELD

The present disclosure relates to an isopropylmalate synthase variant, and a method of producing L-leucine using the same.

BACKGROUND ART

L-Leucine is an essential amino acid, and is an expensive amino acid widely used in medicines, foods, feed additives, industrial chemicals. etc. It is mainly produced using microorganisms. Fermentation production of branched-chain amino acids, including L-leucine, is mainly carried out through microorganisms of the genus *Escherichia* or microorganisms of the genus *Corynebacterium*, and branched-chain amino acids are known to be biosynthesized from pyruvic acid via several steps using 2-ketoisocaproate as a precursor (Korean Patent No. 10-0220018, Korean Patent No. 10-0438146).

Isopropylmalate synthase, which is an enzyme involved in the biosynthesis of L-leucine, is an enzyme of the first step in the biosynthesis of leucine, which converts 2-ketoisovalerate, produced during the valine biosynthetic pathway, into isopropylmalate, which is needed in the biosynthesis of leucine instead of valine, and isopropylmalate synthase is an important enzyme in the process of leucine biosynthesis. However, isopropylmalate synthase is subjected to feedback inhibition by L-leucine, which is a final product, or derivatives thereof. Accordingly, although there is a variety of prior art related to isopropylmalate synthase variants which release feedback inhibition for the purpose of producing a high concentration of leucine (US Patent Publication No. 2015-0079641 and U.S. Pat. No. 6,403,342), research to discover better variants is still continuing.

DISCLOSURE

Technical Problem

The present inventors have endeavored to develop an isopropylmalate synthase variant which may be used for the production of L-leucine with a high concentration, and as a result, they developed a novel isopropylmalate synthase variant, and confirmed that L-leucine may be produced at a high yield from a microorganism including the same, thereby completing the present disclosure.

Technical Solution

An object of the present disclosure is to provide a polypeptide variant having an isopropylmalate synthase activity.

Another object of the present disclosure is to provide a polynucleotide encoding the polypeptide variant of the present disclosure.

Still another object of the present disclosure is to provide a vector comprising the polynucleotide of the present disclosure.

Still another object of the present disclosure is to provide a microorganism of the genus *Corynebacterium* producing L-leucine, the microorganism comprising the polypeptide variant of the present disclosure; a polynucleotide encoding the same; or a vector including the same.

Still another object of the present disclosure is to provide a method of producing L-leucine, the method comprising a step of culturing, in a medium, a microorganism of the genus *Corynebacterium* producing L-leucine, the microorganism comprising the polypeptide variant of the present disclosure; a polynucleotide encoding the same; or a vector including the same.

Still another object of the present disclosure is to provide a composition for producing L-leucine, the composition comprising a *Corynebacterium glutamicum* strain including the polypeptide variant of the present disclosure or the polynucleotide of the present disclosure; or a medium in which the strain is cultured.

Advantageous Effects

In the present disclosure, a polypeptide variant having an isopropylmalate synthase activity has an increased activity, as compared to a wild-type isopropylmalate synthase, and it may be applied to mass-production of L-leucine with high yield.

DETAILED DESCRIPTION OF PREFERRED EMBODIMENTS

The present disclosure will be described in detail as follows. Meanwhile, each description and embodiment disclosed in this disclosure may also be applied to other descriptions and embodiments. That is, all combinations of various elements disclosed in this disclosure fall within the scope of the present disclosure.

Further, the scope of the present disclosure is not limited by the specific description described below. Further, those skilled in the art will recognize, or be able to ascertain using no more than routine experimentation, many equivalents to the specific embodiments of the disclosure described herein. Further, these equivalents should be interpreted to fall within the present disclosure.

To achieve the objects, one aspect of the present disclosure provides a polypeptide variant having an isopropylmalate synthase activity.

Specifically, the polypeptide variant may include one or more substitutions selected from the group consisting of i) a substitution of an amino acid residue corresponding to position 138 with another amino acid residue, ii) a substitution of an amino acid residue corresponding to position 162 with another amino acid residue. iii) a substitution of an amino acid residue corresponding to position 211 with another amino acid residue, iv) a substitution of an amino acid residue corresponding to position 245 with another amino acid residue, and v) a substitution of an amino acid residue corresponding to position 588 with another amino acid residue, in an amino acid sequence of SEQ ID NO: 1.

As used herein, the term "isopropylmalate synthase (IPMS)" refers to an enzyme that converts 2-ketoisovalerate into isopropylmalate, which is a precursor of L-leucine, by reacting with acetyl-CoA. In the present disclosure, the isopropylmalate synthase may be used interchangeably with isopropylmalate synthesizing enzyme, IPMS, LeuA protein, or LeuA.

In the present disclosure, a sequence of the LeuA may be obtained from GenBank of NCBI, which is a known database, and specifically, the LeuA may be a protein having an isopropylmalate synthase activity, which is encoded by leuA gene, but is not limited thereto.

The LeuA may be an enzyme derived from a microorganism of the genus *Corynebacterium*. Specifically, the LeuA may be an isopropylmalate synthase derived from *Corynebacterium glutamicum*.

The LeuA of the present disclosure may include the amino acid sequence of SEQ ID NO: 1, but is not limited thereto. Additionally, the LeuA may include a polypeptide having at least 80%, 90%, 95%, 96%, 97%, 98%, or 99% homology to the amino acid sequence of SEQ ID NO: 1. Further, it is obvious that an amino acid sequence having such homology or identity and exhibiting the activity corresponding to that of the isopropylmalate synthase may be included within the scope of the present disclosure even though it has an amino acid sequence in which some of the sequences are deleted, modified, substituted, or added.

For example, the LeuA may include those having addition or deletion of a sequence that do not alter the function of the protein of the present disclosure, at the N-terminus, C-terminus, and/or inside of the amino acid sequence, or a naturally occurring mutation, a silent mutation, or a conservative substitution.

The "conservative substitution" means substitution of one amino acid with another amino acid having similar structural and/or chemical properties. Such an amino acid substitution may generally occur based on similarity in the polarity, charge, solubility, hydrophobicity, hydrophilicity, and/or amphipathic nature of residues. Usually, conservative substitution may hardly affect or not affect activity of proteins or polypeptides.

The LeuA of the present disclosure may have the amino acid sequence of SEQ ID NO: 1 or an amino acid sequence having 90% or more identity thereto, or may consist of the amino acid sequence or may consist essentially of the amino acid sequence.

As used herein, the term "polypeptide variant" refers to a polypeptide which has an amino acid sequence different from that of the polypeptide variant before modification by conservative substitution and/or modification of one or more amino acids but maintains the functions or properties. Such a polypeptide variant may generally be identified by modifying one or more amino acids of the amino acid sequence of the polypeptide and evaluating the properties of the modified polypeptide. In other words, the ability of the polypeptide variant may be increased, unchanged, or decreased, as compared to that of the polypeptide before variation. Further, some polypeptide variants may include polypeptide variants in which one or more portions such as an N-terminal leader sequence or a transmembrane domain have been removed. Other polypeptide variants may include polypeptide variants in which a portion of the N- and/or C-terminus has been removed from the mature protein. The term "polypeptide variant" may be used interchangeably with terms such as modification, modified polypeptide, modified protein, mutant, mutein, and divergent, and is not limited thereto as long as it is a term used with the meaning of variation.

Further, the polypeptide variant may include deletions or additions of amino acids that have minimal effect on the properties and secondary structure of the polypeptide. For example, a signal (or leader) sequence that is co-translationally or post-translationally involved in the protein translocation may be conjugated to the N-terminus of the polypeptide variant. In addition, the polypeptide variant may be conjugated with other sequences or linkers so as to be identified, purified, or synthesized.

The polypeptide variant of the present disclosure may have an isopropylmalate synthase activity. Further, the polypeptide variant of the present disclosure may have the enhanced isopropylmalate synthase activity, as compared to the wild-type polypeptide having the isopropylmalate synthase activity.

The polypeptide variant of the present disclosure may include one or more substitutions selected from the group consisting of i) a substitution of an amino acid residue corresponding to position 138 with another amino acid residue, ii) a substitution of an amino acid residue corresponding to position 162 with another amino acid residue, iii) a substitution of an amino acid residue corresponding to position 211 with another amino acid residue, iv) a substitution of an amino acid residue corresponding to position 245 with another amino acid residue, and v) a substitution of an amino acid residue corresponding to position 588 with another amino acid residue in the amino acid sequence of SEQ ID NO: 1, specifically, one or more substitutions selected from the group consisting of i) a substitution of leucine, which is the amino acid residue corresponding to position 138, with another amino acid residue other than leucine, ii) a substitution of histidine, which is the amino acid residue corresponding to position 162, with another amino acid residue other than histidine, iii) a substitution of serine, which is the amino acid residue corresponding to position 211, with another amino acid residue other than serine, iv) a substitution of asparagine, which is the amino acid residue corresponding to position 245, with another amino acid residue other than asparagine, and v) a substitution of isoleucine, which is the amino acid residue corresponding to position 588, with another amino acid residue other than isoleucine in the amino acid sequence of SEQ ID NO: 1, and more specifically, one or more substitutions selected from the group consisting of i) a substitution of leucine, which is the amino acid residue corresponding to position 138, with glycine, ii) a substitution of histidine, which is the amino acid residue corresponding to position 162, with glutamate, iii) a substitution of serine, which is the amino acid residue corresponding to position 211, with leucine, iv) a substitution of asparagine, which is the amino acid residue corresponding to position 245, with serine, and v) a substitution of isoleucine, which is the amino acid residue corresponding to position 588, with proline in the amino acid sequence of SEQ ID NO: 1, and much more specifically, one or more, two or more, three or more, four or more, and five substitutions. The two or more substitutions may be a combination of i) and v); a combination of ii) and v): a combination of iii) and v): or a combination of iv) and v), but are not limited thereto. The four or more substitutions may be a combination of i), ii), iii), and iv), but are not limited thereto. The five or more substitutions may be a combination of i), ii), iii), iv) and v).

The polypeptide variant of the present disclosure may have/include an amino acid sequence of SEQ ID NO: 6 or SEQ ID NO: 8 or SEQ ID NO: 10 or SEQ ID NO: 12 or SEQ ID NO: 14. or may consist of/may consist essentially of the amino acid sequence of SEQ ID NO: 6 or SEQ ID NO: 8 or SEQ ID NO: 10 or SEQ ID NO: 12 or SEQ ID NO: 14. The polypeptide variant of the present disclosure may include a polypeptide having at least 80%, 90%, 95%, 96%, 97%, 98%, or 99% or more, and less than 100% identity or homology to the amino acid sequence of SEQ ID NO: 6 or SEQ ID NO: 8 or SEQ ID NO: 10 or SEQ ID NO: 12 or SEQ ID NO: 14, in which i) the amino acid residue corresponding to position 138 is glycine, ii) the amino acid residue corresponding to position 162 is glutamate, iii) the amino acid residue corresponding to position 211 is leucine, iv) the amino acid residue corresponding to position 245 is serine, or v) the amino acid residue corresponding to position 588 is proline in the amino acid sequence of SEQ ID NO: 6 or SEQ ID NO: 8 or SEQ ID NO: 10 or SEQ ID NO: 12 or SEQ ID NO: 14. Specifically, SEQ ID NO: 6 may be an amino acid sequence, in which leucine which is the amino acid residue corresponding to position 138 in the amino acid sequence of SEQ ID NO: 1 is substituted with glycine, SEQ ID NO: 8 may be an amino acid sequence, in which histidine which is the amino acid residue corresponding to position 162 is substituted with glutamate. SEQ ID NO: 10 may be an amino acid sequence, in which serine which is the amino acid residue corresponding to position 211 is substituted with leucine, SEQ ID NO: 12 may be an amino acid sequence, in which isoleucine which is the amino acid residue corresponding to position 588 is substituted with proline, and SEQ ID NO: 14 may be an amino acid sequence, in which asparagine which is the amino acid residue corresponding to position 245 is substituted with serine.

Further, it is obvious that a polypeptide variant having an amino acid sequence, in which some of the sequences are deleted, modified, substituted, conservatively substituted, or added, in addition to i) the position 138, ii) the position 162, iii) the position 211, iv) the position 245, or v) the position 588 in the amino acid sequence of SEQ ID NO: 6 or SEQ ID NO: 8 or SEQ ID NO: 10 or SEQ ID NO: 12 or SEQ ID NO: 14, is also included in the scope of the present disclosure, as long as the amino acid sequence has such identity or homology and exhibits the efficacy corresponding to that of the polypeptide variant of the present disclosure. Specifically, the substitution may include any one or more of (1) a variation (R558H) of substituting histidine for arginine which is the amino acid corresponding to position 558 of LeuA protein by substituting A for G which is a nucleotide at position 1673 of leuA gene encoding isopropylmalate synthase, (2) a variation (G561D) of substituting aspartic acid for glycine which is the amino acid corresponding to position 561 by substituting AT for GC which are nucleotides at positions 1682 and 1683 of leuA gene, or (3) a variation (P247C) of substituting cysteine for proline which is the amino acid at position 247 by substituting TG for CC which are nucleotides at positions 739 and 740 of leuA gene, and descriptions thereof are as described above.

More specifically, the polypeptide variant may include a polypeptide including variations (SEQ ID NO: 38) at positions 247, 558, and 561 in addition to i) the variation at position 138; or variations (SEQ ID NO: 40) at positions 247, 558, and 561 in addition to ii) the variation at position 162; or variations (SEQ ID NO: 42) at positions 247, 558, and 561 in addition to iii) the variation at position 211; variations (SEQ ID NO: 44) at positions 247, 558, and 561 in addition to iv) the variation at position 245; variations (SEQ ID NO: 46) at positions 247, 558, and 561 in addition to v) the variation at position 588; variations (SEQ ID NO: 48) at positions 247, 558, and 561 in addition to iii) the variation at position 211 and v) the variation at 588: variations (SEQ ID NO: 50) at positions 247, 558, and 561 in addition to i) the variation at position 138, ii) the variation at position 162, iii) the variation at position 211, and iv) the variation at position 245; or variations (SEQ ID NO: 52) at positions 247, 558, and 561 in addition to i) the variation at position 138, ii) the variation at position 162, iii) the variation at position 211, iv) the variation at position 245, and v) the variation at position 588, but is not limited thereto.

As used herein, the term "corresponding to" refers to amino acid residues at positions listed in the polypeptide, or amino acid residues that are similar, identical, or homologous to those listed in the polypeptide. Identifying the amino acid at the corresponding position may be determining a specific amino acid in a sequence that refers to a specific sequence. As used herein, "corresponding region" generally refers to a similar or corresponding position in a related protein or a reference protein.

For example, an arbitrary amino acid sequence is aligned with SEQ ID NO: 1. and based on this, each amino acid residue of the amino acid sequence may be numbered with reference to the amino acid residue corresponding to the amino acid residue of SEQ ID NO: 1. For example, a sequence alignment algorithm as described in the present disclosure may determine the position of an amino acid or the position at which modification such as substitution, insertion, or deletion occurs through comparison with that in a query sequence (also referred to as a "reference sequence").

For such alignments, for example, the Needleman-Wunsch algorithm (Needleman and Wunsch, 1970, J. Mol. Biol. 48: 443-453). the Needleman program of EMBOSS package (EMBOSS: The European Molecular Biology Open Software Suite, Rice et al., 2000), Trends Genet. 16: 276-277) and the like may be used, but are not limited thereto, and a sequence alignment program, a pairwise sequence comparison algorithm, etc., known in the art, may be appropriately used.

As used herein, the term 'homology' or 'identity' means the degree of similarity between two given amino acid sequences or base sequences and may be expressed as a percentage. The terms 'homology and identity' may often be used interchangeably.

The sequence homology or identity of a conserved polynucleotide or polypeptide is determined by standard alignment algorithms, and the default gap penalty established by a program to be used may be used together. Substantially, homologous or identical sequences are generally capable of being hybridized with the entirety or a part of the sequence under moderately or highly stringent conditions. It is apparent that hybridization also includes hybridization of a polynucleotide with a polynucleotide including a general codon or a codon in consideration of codon degeneracy.

Whether any two polynucleotide or polypeptide sequences have homology, similarity, or identity may be determined using known computer algorithms such as the "FASTA" program, for example, using default parameters as in Pearson et al (1988) [Proc. Natl. Acad. Sci. USA 85]: 2444. Alternatively, the homology, similarity, or identity may be determined using Needleman-Wunsch algorithm (Needleman and Wunsch, 1970, J. Mol. Biol. 48: 443-453) as performed in the Needleman program of the EMBOSS package (EMBOSS: The European Molecular Biology Open Software Suite, Rice et al., 2000, Trends Genet. 16: 276-277) (version 5.0.0 or later) (including GCG program package (Devereux, J., et al, Nucleic Acids Research 12: 387 (1984)), BLASTP, BLASTN, FASTA (Atschul, [S,][F.,] [ET AL, J MOLEC BIOL 215]: 403 (1990); Guide to Huge Computers, Martin J. Bishop, [ED.,] Academic Press, San Diego, 1994, and [CARILLO ET AU.](1988) SIAM J Applied Math 48: 1073). For example, BLAST of the National Center for Biotechnology Information or ClustalW may be used to determine the homology, similarity, or identity.

The homology, similarity, or identity of polynucleotides or polypeptides may be determined by comparing sequence information using, for example, a GAP computer program such as Needleman et al. (1970), J Mol Biol. 48:443. as announced in, for example, Smith and Waterman, Adv. Appl. Math (1981) 2:482. In summary, the GAP program may be defined as the value acquired by dividing the number of similarly aligned symbols (namely, nucleotides or amino acids) by the total number of symbols in the shorter of two sequences. The default parameters for the GAP program may include (1) a binary comparison matrix (including values of 1 for identity and 0 for non-identity) and a weighted comparison matrix of Gribskov et al(1986) Nucl. Acids Res. 14: 6745 (or EDNAFULL (EMBOSS version of NCBI NUC4.4) substitution matrix) as disclosed in Schwartz and Dayhoff, eds., Atlas Of Protein Sequence And Structure, National Biomedical Research Foundation, pp. 353-358 (1979); (2) a penalty of 3.0 for each gap and an additional 0.10 penalty for each symbol in each gap (or gap opening penalty of 10, gap extension penalty of 0.5): and (3) no penalty for end gaps.

Another aspect of the present disclosure provides a polynucleotide encoding the polypeptide variant of the present disclosure.

As used herein, the term "polynucleotide" is a DNA or RNA strand having a certain length or more as a polymer of nucleotides in which nucleotide monomers are connected in a long chain by covalent bonds, and more specifically, it means a polynucleotide fragment encoding the protein variant.

The polynucleotide encoding the polypeptide variant of the present disclosure may include a nucleotide sequence encoding the amino acid sequence described by SEQ ID NO: 6 or SEQ ID NO: 8 or SEQ ID NO: 10 or SEQ ID NO: 12 or SEQ ID NO: 14 or SEQ ID NO: 38 or SEQ ID NO: 40 or SEQ ID NO: 42 or SEQ ID NO: 44 or SEQ ID NO: 46 or SEQ ID NO: 48 or SEQ ID NO: 50 or SEQ ID NO: 52, but is not limited thereto. Specifically, the polynucleotide of the present disclosure may have or include a nucleotide sequence of SEQ ID NO: 7 or SEQ ID NO: 9 or SEQ ID NO: 11 or SEQ ID NO: 13 or SEQ ID NO: 15 or SEQ ID NO: 39 or SEQ ID NO: 41 or SEQ ID NO: 43 or SEQ ID NO: 45 or SEQ ID NO: 47 or SEQ ID NO: 49 or SEQ ID NO: 51 or SEQ ID NO: 53.

In the polynucleotide, various modifications may be made in the coding region as long as the amino acid sequence of the polypeptide is not changed, in consideration of codon degeneracy or codons preferred in organisms that are intended to express the polypeptide. Specifically, the polynucleotide may consist of a nucleotide sequence having 80% or more, 90% or more, 95% or more, 96% or more, 97% or more, 98% or more, and less than 100% homology or identity to SEQ ID NO: 7 or SEQ ID NO: 9 or SEQ ID NO: 11 or SEQ ID NO: 13 or SEQ ID NO: 15 or SEQ ID NO: 39 or SEQ ID NO: 41 or SEQ ID NO: 43 or SEQ ID NO: 45 or SEQ ID NO: 47 or SEQ ID NO: 49 or SEQ ID NO: 51 or SEQ ID NO: 53, but is not limited thereto.

Further, the polynucleotide of the present disclosure may include a probe that may be prepared from a known gene sequence, for example, a sequence without limitation as long as it is a sequence that may hybridize with a complementary sequence to the entirety or a part of the polynucleotide sequence of the present disclosure under stringent conditions. The "stringent conditions" mean conditions that enable specific hybridization between polynucleotides.

These conditions are specifically described in documents (see J. Sambrook et al., Molecular Cloning, A Laboratory Manual, 2nd Edition, Cold Spring Harbor Laboratory press. Cold Spring Harbor, New York, 1989: F. M. Ausubel et al., Current Protocols in Molecular Biology, John Wiley & Sons, Inc., New York, 9.50-9.51, 11.7-11.8). Examples thereof include conditions in which polynucleotides having higher homology or identity, namely, polynucleotides having 70% or more, 75% or more, 80% or more, 85% or more, 90% or more, 95% or more, 96% or more, 97% or more, 98% or more, or 99% or more homology or identity are hybridized with each other while polynucleotides having lower homology or identity are not hybridized with each other, or washing conditions for common Southern hybridization, in which washing is performed once, specifically, two to three times at a salt concentration and temperature equivalent to 60° C. 1×SSC. 0.1% SDS, specifically 60° C., 0.1×SSC, 0.1% SDS, more specifically, 68° C., 0.1×SSC, 0.1% SDS.

Hybridization requires that two nucleic acids have complementary sequences, although mismatches between bases are allowed depending on the stringency of hybridization. The term "complementary" is used to describe the relation between nucleotide bases capable of being hybridized with each other. For example, with regard to DNA, adenine is complementary to thymine and cytosine is complementary to guanine. Therefore, the polynucleotide of the present disclosure may also include substantially similar nucleic acid sequences as well as isolated nucleic acid fragments that are complementary to the entire sequence.

Specifically, a polynucleotide having homology or identity to the polynucleotide of the present disclosure may be detected using hybridization conditions including a hybridization step at a Tm value of 55° C. and the above-described conditions. The Tm value may be 60° C., 63° C., or 65° C., but is not limited thereto, and may be appropriately adjusted by those skilled in the art according to the purpose.

The appropriate stringency to hybridize the polynucleotide depends on the length and degree of complementarity of the polynucleotide, and the variables are well known in the art (e.g., J. Sambrook et al., supra).

For example, the polynucleotide of the present disclosure may include any sequence without limitation as long as it encodes the amino acid sequence of SEQ ID NO: 6 or SEQ ID NO: 8 or SEQ ID NO: 10 or SEQ ID NO: 12 or SEQ ID NO: 14 or SEQ ID NO: 38 or SEQ ID NO: 40 or SEQ ID NO: 42 or SEQ ID NO: 44 or SEQ ID NO: 46 or SEQ ID NO: 48 or SEQ ID NO: 50 or SEQ ID NO: 52.

In the polynucleotide of the present disclosure, the polypeptide variant is as described in other aspects.

Still another aspect of the present disclosure provides a vector comprising the polynucleotide of the present disclosure.

The vector of the present disclosure refers to a DNA construct including a polynucleotide sequence encoding the polypeptide of interest operably linked to a suitable expression regulatory region (expression regulatory sequence) so that the polypeptide of interest may be expressed in a suitable host. The expression regulatory region may include a promoter capable of initiating transcription, any operator sequence for regulating the transcription. a sequence encoding a suitable mRNA ribosome binding site, and a sequence regulating termination of transcription and translation. The vector may be transformed into a suitable host cell and then replicated or function independently of the host genome, or may be integrated into the genome itself.

The vector used in the present disclosure is not particularly limited, but any vector known in the art may be used. Examples of commonly used vectors may include natural or recombinant plasmids, cosmids, viruses, and bacteriophages. For example, pWE15, M13, MBL3, MBL4, IXII, ASHII, APII, t10, t11, Charon4A, Charon21A, or the like may be used as a phage vector or a cosmid vector. pBR system, pUC system, pBluescript II system, pGEM system, pTZ system, pCL system, pET system, or the like may be used as a plasmid vector. Specifically. pDCM2(WO WO2021-187781 A1), pACYC177, pACYC184, pCL, pECCG117. pUC19, pBR322, pMW118, pCC1BAC vector or the like may be used.

For example, a polynucleotide encoding a polypeptide of interest may be inserted into a chromosome through a vector for intracellular chromosome insertion. Insertion of the polynucleotide into the chromosome may be performed by any method known in the art, for example, homologous recombination, but is not limited thereto. The vector may further include a selection marker for identifying the chromosome insertion. The selection marker is for selecting the cells transformed with vectors, i.e., for identifying the insertion of a nucleic acid molecule of interest, and markers that confer selectable phenotypes such as drug resistance, auxotrophy, resistance to cytotoxic agents, or expression of surface polypeptides may be used. In an environment treated with a selective agent, only cells expressing the selection marker survive or exhibit other phenotypic traits, and thus transformed cells may be selected.

As used herein, the term "transformation" means that a vector including a polynucleotide encoding a target protein is introduced into a host cell or a microorganism so that the protein encoded by the polynucleotide may be expressed in the host cell. The transformed polynucleotide may be located by being inserted into the chromosome of the host cell or located outside the chromosome as long as it may be expressed in the host cell. Further, the polynucleotide includes DNA and RNA encoding a protein of interest. The polynucleotide may be introduced in any form as long as it may be introduced into a host cell and then expressed. For example, the polynucleotide may be introduced into a host cell in the form of an expression cassette, which is a gene construct containing all elements required for self-expression. The expression cassette may usually include a promoter operably linked to the polynucleotide, a transcription termination signal, a ribosome binding site, and a translation termination signal. The expression cassette may be in the form of an expression vector capable of self-replicating. Further, the polynucleotide may be introduced into a host cell in its own form and operably linked to a sequence required for expression in the host cell, but is not limited thereto.

Further, as used herein, the term "operably linked" means that the polynucleotide sequence is functionally linked to a promoter sequence that initiates and mediates transcription of the polynucleotide encoding the protein variant of interest of the present disclosure.

In the vector of the present disclosure, the polynucleotide is as described in other aspects.

Still another aspect of the present disclosure provides a microorganism of the genus *Corynebacterium* producing L-leucine, the microorganism comprising the polypeptide variant of the present disclosure: the polynucleotide encoding the same; or the vector including the same.

As used herein, the term "microorganism" includes all of wild-type microorganisms or naturally or artificially genetically modified microorganisms, and it may be a microorganism in which a specific mechanism is weakened or strengthened due to insertion of a foreign gene or activity enhancement or inactivation of an endogenous gene, and may be a microorganism including a genetic modification for the production of the polypeptide, protein, or product of interest.

The microorganism of the present disclosure may be a microorganism including any one or more of the variant of the present disclosure, the polynucleotide of the present disclosure, and the vector including the polynucleotide of the present disclosure; a microorganism modified to express the variant of the present disclosure or the polynucleotide of the present disclosure; a microorganism (e.g., recombinant strain) expressing the variant of the present disclosure or the polynucleotide of the present disclosure: or a microorganism (e.g., recombinant strain) having the activity of the variant of the present disclosure, but is not limited thereto.

The microorganism of the present disclosure may be a microorganism naturally having the isopropylmalate synthase activity or the L-leucine-producing ability, or a microorganism prepared by expressing the polypeptide variant of the present disclosure in a parent strain having no isopropylmalate synthase activity or no L-leucine-producing ability, or by providing the L-leucine-producing ability for the parent strain, but is not limited thereto.

Specifically, the microorganism of the present disclosure may be a cell or microorganism expressing the polypeptide variant of the present disclosure by transforming with the polynucleotide of the present disclosure or the vector including the gene encoding the polypeptide variant of the present disclosure, and with respect to the objects of the present disclosure, the microorganism of the present disclosure may include all microorganisms capable of producing L-leucine by including the polypeptide variant of the present disclosure. For example, the microorganism of the present disclosure may be a recombinant microorganism having the enhanced L-leucine-producing ability, in which the polypeptide variant of the present disclosure is expressed by introducing the polynucleotide encoding the polypeptide variant of the present disclosure into a natural wild-type or L-leucine-producing microorganism. The recombinant microorganism having the enhanced L-leucine-producing ability may be a microorganism having the enhanced L-leucine-producing ability, as compared to the natural wild-type or unmodified microorganism, but is not limited thereto.

As used herein, the term "unmodified microorganism" does not exclude strains including mutations that may occur naturally in microorganisms, and may be a wild-type strain or a natural strain itself or may be a strain before the trait is changed by genetic variation due to natural or artificial factors. For example, the unmodified microorganism may be a strain into which the protein variant described in the present specification is not introduced or has not yet been introduced. The term "unmodified microorganism" may be used interchangeably with "strain before being modified", "microorganism before being modified", "unvaried strain", "unmodified strain", "unvaried microorganism", or "reference microorganism".

Specifically, the microorganism of the present disclosure may be *Corynebacterium glutamicum, Corynebacterium crudilactis, Corynebacterium deserti. Corynebacterium efficiens, Corynebacterium callunae, Corynebacterium stationis, Corynebacterium singulare, Corynebacterium halotolerans, Corynebacterium stratum, Corynebacterium ammoniagenes, Corynebacterium pollutisoli, Corynebacterium imitans, Corynebacterium testudinoris*, or *Corynebacterium flavescens*.

The microorganism of the present disclosure may be a microorganism including a nucleotide sequence encoding isopropylmalate synthase, in which one or more amino acid residues, excluding the amino acid residue i) at position 138, ii) at position 162, iii) at position 211, iv) at position 245, or v) at position 588 in the amino acid sequence of SEQ ID NO: 1 constituting the isopropylmalate synthase of the present disclosure, are substituted with another amino acid. Specifically, the substitution may include any one or more of (1) a variation (R558H) of substituting histidine for arginine which is the amino acid at position 558 of LeuA protein by substituting A for G which is a nucleotide at position 1673 of leuA gene encoding isopropylmalate synthase, (2) a variation (G561D) of substituting aspartic acid for glycine which is the amino acid at position 561 by substituting AT for GC which are nucleotides at positions 1682 and 1683 of leuA gene, or (3) a variation (P247C) of substituting cysteine for proline which is the amino acid at position 247 by substituting TG for CC which are nucleotides at positions 739 and 740 of leuA gene, and descriptions thereof are as described above.

Specifically, the microorganism producing L-leucine of the present disclosure may be a microorganism having the enhanced isopropylmalate synthase activity by expressing the isopropylmalate synthase including such a variation.

As used herein, the term "enhancement" of polypeptide activity means that the activity of a polypeptide is increased as compared to the intrinsic activity. The enhancement may be used interchangeably with terms such as up-regulation, overexpression, increase, etc. Here, the increase may include both exhibiting activity that was not originally possessed and exhibiting improved activity, as compared to the intrinsic activity or activity before modification. The "intrinsic activity" means activity of a specific polypeptide originally possessed by a parent strain before change of the trait or an unmodified microorganism when the trait is changed by genetic variation due to natural or artificial factors. This may be used interchangeably with "activity before modification". The fact that the activity of a polypeptide is "enhanced" or "increased", as compared to the intrinsic activity, means that the activity of a polypeptide is improved, as compared to the activity of a specific polypeptide originally possessed by a parent strain before change of the trait or an unmodified microorganism.

The enhancement may be achieved through the introduction of a foreign polypeptide or the enhancement of intrinsic activity of the polypeptide. The enhancement of activity of the polypeptide may be confirmed by an increase in the degree of activity and the expression level of the corresponding polypeptide or in the amount of a product produced from the corresponding polypeptide.

For the activity enhancement of the polypeptide, various methods well known in the art may be applied, and the method is not limited as long as the activity of the polypeptide of interest may be enhanced, as compared to that of the microorganism before being modified. Specifically, genetic engineering and/or protein engineering well known to those skilled in the art, which are routine methods of molecular biology, may be used, but the method is not limited thereto (e.g., Sitnicka et al. Functional Analysis of Genes. Advances in Cell Biology. 2010, Vol. 2. 1-16, Sambrook et al. Molecular Cloning 2012, etc.).

Specifically, the enhancement of the activity of the polypeptide of the present disclosure may be performed by:
1) increase in the intracellular copy number of the polynucleotide encoding the polypeptide;
2) replacement of a gene expression regulatory region on a chromosome encoding the polypeptide with a sequence exhibiting strong activity;
3) modification of a start codon of the gene encoding the polypeptide or a base sequence of a 5'-UTR region:
4) modification of the amino acid sequence of the polypeptide to enhance the activity of the polypeptide;
5) modification of the polynucleotide sequence encoding the polypeptide to enhance the activity of the polypeptide;
6) introduction of a foreign polynucleotide exhibiting the activity of the polypeptide;
7) codon optimization of the polynucleotide encoding the polypeptide;
8) analysis of the tertiary structure of the polypeptide to select the exposed site and to perform modification or chemical modification of the exposed site; or
9) a combination of 1) to 8), but is not particularly limited thereto.

More specifically, (1) the increase in the intracellular copy number of the polynucleotide encoding the polypeptide may be performed by introducing a vector, which replicates and functions irrespective of a host cell and is operably linked to the polynucleotide encoding the corresponding polypeptide, into a host cell. Alternatively, the increase may be achieved by the introduction of one copy or two or more copies of the polynucleotide encoding the corresponding polypeptide into a chromosome of a host cell. The introduction into the chromosome may be performed by introducing a vector capable of inserting the polynucleotide into a chromosome of a host cell into the host cell, but is not limited thereto. The vector is as described above.

2) The replacement of a gene expression control region (or expression control sequence) on a chromosome encoding a polypeptide with a sequence exhibiting strong activity may be, for example, occurrence of variation in a sequence due to deletion, insertion, non-conservative or conservative substitution, or a combination thereof, or replacement with a sequence exhibiting stronger activity so that the activity of the expression control region is further enhanced. The expression control region is not particularly limited thereto, but may include a promoter, an operator sequence, a sequence encoding a ribosome binding site, a sequence controlling the termination of transcription and translation, and the like. For example, the replacement may be to replace the original promoter with a strong promoter, but is not limited thereto.

Examples of known strong promoters include cj1 to cj7 promoters (U.S. Pat. No. 7,662,943 B2), lac promoter, trp promoter, trc promoter, tac promoter, lambda phage PR promoter, PL promoter, tet promoter, gapA promoter, SPL7 promoter, SPL13(sm3) promoter (U.S. patent Ser. No. 10/584,338 B2), 02 promoter (U.S. patent Ser. No. 10/273, 491 B2), tkt promoter, yccA promoter, etc., but are not limited thereto.

3) The modification of a start codon of the gene encoding the polypeptide or a base sequence of a 5'-UTR region may be, for example, substitution with another start codon having a higher polypeptide expression rate, as compared to an endogenous start codon, but is not limited thereto.

4) and 5) The modification of the amino acid sequence or polynucleotide sequence may be occurrence of variation in the sequence due to deletion, insertion, nonconservative or conservative substitution of an amino acid sequence of the polypeptide or a polynucleotide sequence encoding the polypeptide or a combination thereof, or replacement with an amino acid sequence or polynucleotide sequence modified to have stronger activity or an amino acid sequence or polynucleotide sequence modified to be more active so that the activity of the polypeptide is enhanced, but is not limited thereto. The replacement may be specifically performed by inserting a polynucleotide into a chromosome by homologous recombination, but is not limited thereto. The vector used here may further include a selection marker for the confirmation of chromosome insertion. The selection marker is as described above.

6) The introduction of a foreign polynucleotide exhibiting the activity of the polypeptide may be the introduction of a foreign polynucleotide encoding a polypeptide exhibiting activity identical/similar to that of the polypeptide into a host cell. The foreign polynucleotide is not limited in its origin or sequence as long as it exhibits activity identical/similar to that of the polypeptide. The introduction may be performed by appropriately selecting a known transformation method by those skilled in the art. As the introduced polynucleotide is expressed in a host cell, a polypeptide may be produced, and the activity thereof may be increased.

7) The codon optimization of the polynucleotide encoding the polypeptide may be codon optimization of an endogenous polynucleotide so as to increase transcription or translation in a host cell or codon optimization of a foreign polynucleotide so as to perform optimized transcription and translation in a host cell.

8) The analysis of the tertiary structure of the polypeptide to select the exposed site and to perform modification or chemical modification of the exposed site may be, for example, to determine a template protein candidate according to the degree of similarity of the sequence by comparing the sequence information of a polypeptide to be analyzed with a database storing the sequence information of known proteins, to identify the structure based on this, and to select and to modify or chemically modify the exposed portion to be modified or chemically modified.

Such enhancement of the polypeptide activity may be an increase in the activity or concentration of the corresponding polypeptide, based on the activity or concentration of the polypeptide expressed in a wild-type or a microbial strain before being modified, or an increase in the amount of a product produced from the corresponding polypeptide, but is not limited thereto.

In the microorganism of the present disclosure, partial or entire modification of a polynucleotide (e.g., modification for coding the above-described protein variant) may be induced by (a) homologous recombination using a vector for chromosome insertion in the microorganism or genome editing using engineered nuclease (e.g., CRISPR-Cas9) and/ or (b) treatment with light such as ultraviolet rays and radiation and/or chemicals, but is not limited thereto. A method of modifying a part or the entirety of the gene may include a method of using DNA recombination technology. For example, by introducing a nucleotide sequence or vector containing a nucleotide sequence homologous to the gene of interest into the microorganism to cause homologous recombination, a part or the entirety of the gene may be deleted. The introduced nucleotide sequence or vector may include a dominant selection marker, but is not limited thereto.

More specifically, the microorganism producing L-leucine of the present disclosure may be a microorganism further including a polypeptide including SEQ ID NO: 6 or SEQ ID NO: 8 or SEQ ID NO: 10 or SEQ ID NO: 12 or SEQ ID NO: 14 or SEQ ID NO: 38 or SEQ ID NO: 40 or SEQ ID NO: 42 or SEQ ID NO: 44 or SEQ ID NO: 46 or SEQ ID NO: 48 or SEQ ID NO: 50 or SEQ ID NO: 52. a polynucleotide encoding the polypeptide including SEQ ID NO: 6 or SEQ ID NO: 8 or SEQ ID NO: 10 or SEQ ID NO: 12 or SEQ ID NO: 14 or SEQ ID NO: 38 or SEQ ID NO: 40 or SEQ ID NO: 42 or SEQ ID NO: 44 or SEQ ID NO: 46 or SEQ ID NO: 48 or SEQ ID NO: 50 or SEQ ID NO: 52, or a polynucleotide including SEQ ID NO:7 or SEQ ID NO:9 or SEQ ID NO: 11 or SEQ ID NO: 13 or SEQ ID NO: 15 or SEQ ID NO: 39 or SEQ ID NO: 41 or SEQ ID NO: 43 or SEQ ID NO: 45 or SEQ ID NO: 47 or SEQ ID NO: 49 or SEQ ID NO: 51 or SEQ ID NO: 53.

In the microorganism of the present disclosure, the polypeptide variant, polynucleotide, vector, L-leucine, etc. are as described in other aspects.

Still another aspect of the present disclosure provides a method of producing L-leucine, the method comprising a step of culturing, in a medium, a microorganism of the genus *Corynebacterium* producing L-leucine, the microorganism comprising the polypeptide variant of the present disclosure; a polynucleotide encoding the same; or a vector including the same.

As used herein, the term "culture" means growing the microorganism of the genus *Corynebacterium* of the present disclosure under appropriately controlled environmental conditions. The culture process of the present disclosure may be performed according to suitable medium and culture conditions known in the art. Such a culture process may be easily adjusted and used by those skilled in the art according to the selected strain. Specifically, the culture may be a batch type, continuous type, and fed-batch type, but is not limited thereto.

As used herein, the term "medium" means a mixed substance containing nutrients required to culture the microorganism of the genus *Corynebacterium* of the present disclosure as a main component, and the medium supplies nutrients and growth factors, including water, which are indispensable for survival and development. Specifically, as the medium and other culture conditions used for culture of the microorganism of the genus *Corynebacterium* of the present disclosure, any one may be used without particular limitation as long as it is a medium used for common culture of microorganisms. The *Corynebacterium glutamicum* strain of the present disclosure may be cultured in a common medium containing proper carbon sources, nitrogen sources, phosphorus sources, inorganic compounds, amino acids and/or vitamins, etc., while controlling the temperature, pH, etc. under aerobic conditions. Specifically, the culture medium for the strain of the genus *Corynebacterium* may be found in the document ["Manual of Methods for General Bacteriology" by the American Society for Bacteriology (Washington D.C., USA, 1981)].

In the present disclosure, the carbon sources include carbohydrates such as glucose, saccharose, lactose, fructose, sucrose, maltose, etc.; sugar alcohols such as mannitol, sorbitol, etc., organic acids such as pyruvic acid, lactic acid, citric acid, etc.: amino acids such as glutamic acid, methionine, lysine, etc.; and the like. Natural organic nutrients such as starch hydrolysate, molasses, blackstrap molasses, rice bran, cassava, sugarcane residue, and corn steep liquor may be used. Specifically, carbohydrates such as glucose and sterilized pretreated molasses (i.e., molasses converted to reducing sugar) may be used, and appropriate amounts of other carbon sources may be used in various manners without limitation. These carbon sources may be used alone or in combination of two or more thereof, but are not limited thereto.

As the nitrogen sources, inorganic nitrogen sources such as ammonia, ammonium sulfate, ammonium chloride, ammonium acetate, ammonium phosphate, ammonium carbonate, ammonium nitrate, etc.; and organic nitrogen sources such as amino acids such as glutamic acid, methionine, glutamine, etc., peptone, NZ-amine, meat extract, yeast extract, malt extract, corn steep liquor, casein hydrolysate, fish or decomposition products thereof, and skim soybean cake or decomposition products thereof. etc. may be used. These nitrogen sources may be used alone or in combination of two or more thereof, but are not limited thereto.

The phosphorus sources may include monopotassium phosphate, dipotassium phosphate, or sodium-containing salts corresponding thereto. As the inorganic compounds, sodium chloride, calcium chloride, iron chloride, magnesium sulfate, iron sulfate, manganese sulfate, calcium carbonate, etc. may be used. In addition to these compounds, amino acids, vitamins and/or suitable precursors, etc. may be included. These components or precursors may be added to the medium batchwise or continuously, but is not limited thereto.

Further, during the culture of the *Corynebacterium glutamicum* strain of the present disclosure, pH of the medium may be adjusted by adding compounds such as ammonium hydroxide, potassium hydroxide, ammonia, phosphoric acid, or sulfuric acid to the medium in a proper manner. During the culture, foaming may be suppressed by using an antifoaming agent such as fatty acid polyglycol ester. Oxygen or oxygen-containing gas may be injected into the medium in order to maintain the aerobic state of the medium, or gas may not be injected or nitrogen. hydrogen, or carbon dioxide gas may be injected in order to maintain the anaerobic and microaerobic states, but is not limited thereto.

In the culture of the present disclosure, the culture temperature may be maintained at 20° C. to 45° C. specifically, at 25° C. to 40° C., and the strain may be cultured for about 10 hours to about 160 hours, but are not limited thereto.

L-leucine produced through the culture of the present disclosure may be secreted into the medium or may remain in the cells.

The method of producing L-leucine of the present disclosure may further include a step of preparing the *Corynebacterium glutamicum* strain of the present disclosure, or a step of preparing a medium for culture of the strain.

The method of producing L-leucine of the present disclosure may further include a step of recovering L-leucine from the medium according to the culture or from the *Corynebacterium glutamicum* strain of the present disclosure.

The recovery may be to collect L-leucine of interest by way of a suitable method known in the art according to the method of culturing the microorganism of the present disclosure, for example, a batch, continuous, or fed-batch culture method. For example, centrifugation, filtration, treatment with a crystallized protein precipitant (salting out), extraction, ultrasonic disintegration, ultrafiltration, dialysis, various forms of chromatography such as molecular sieve chromatography (gel filtration), adsorption chromatography, ion-exchange chromatography, and affinity chromatography, HPLC, or a combination thereof may be used. The L-leucine of interest may be recovered from the medium or microorganism by way of a suitable method known in the art.

Further, the method of producing L-leucine of the present disclosure may further include a purification step. The purification may be performed by way of a suitable method known in the art. For example, when the method of producing L-leucine of the present disclosure includes both the recovery step and the purification step, the recovery step and the purification step may be performed continuously or discontinuously regardless of the order, or may be performed simultaneously or by being combined into one step, but is not limited thereto.

In the method of the present disclosure, the polypeptide variant, polynucleotide. L-leucine, and the like are as described in other aspects.

Still another aspect of the present disclosure provides a composition for producing L-leucine, the composition comprising the *Corynebacterium glutamicum* strain including the polypeptide variant of the present disclosure or the polynucleotide of the present disclosure; or a medium in which the strain is cultured.

The composition of the present disclosure may further include arbitrary suitable excipients to be commonly used in compositions for producing amino acids. Such excipients may be, for example, a preservative, a wetting agent, a dispersing agent, a suspending agent, a buffering agent, a stabilizer, or an isotonic agent, but are not limited thereto.

In the composition of the present disclosure, the polypeptide variant, polynucleotide. L-leucine, and the like are as described in other aspects.

MODE FOR CARRYING OUT THE INVENTION

Hereinafter, the present disclosure will be described in more detail with reference to exemplary embodiments. However, the following exemplary embodiments are only preferred embodiments for illustrating the present disclosure, and thus are not intended to limit the scope of the present disclosure thereto. Meanwhile, technical matters not described in the present specification can be sufficiently understood and easily implemented by those skilled in the technical field of the present disclosure or similar technical fields.

Example 1. Construction of DNA Library Encoding Mutated Isopropylmalate Synthase 1-1. Construction of Vector Including leuA To construct a leuA mutant library having an isopropylmalate synthase activity, a recombinant vector including leuA was first constructed. In order to amplify leuA gene (SEQ ID NO: 2) encoding LeuA protein (SEQ ID NO: 1, Uniprot accession code: P42455) derived from the wild-type *Corynebacterium glutamicum*, PCR was performed using the chromosome of the wild strain *Corynebacterium glutamicum* ATCC13032 as a template and primers of SEQ ID NOS: 3 and 4 by repeating 25 cycles consisting of denaturation at 94° C. for 1 minute, annealing at 58° C. for 30 seconds, and polymerization at 72° C. for 1 minute using Pfu DNA polymerase. Sequences of the used primers are as in Table 1 below.

TABLE 1

| SEQ ID NO. | Sequence name | Sequence (5'->3') |
|---|---|---|
| SEQ ID NO: 3 | Primer 1 | TATGCTTCACCACATGACTTC |
| SEQ ID NO: 4 | Primer 2 | AAATCATTTGAGAAAACTCGAGG |

The PCR product was cloned into an *E. coli* vector pCR2.1 using a TOPO cloning kit (Invitrogen) to obtain 'pCR-leuA'.

1-2. Construction of leuA Mutant Library

Based on the vector prepared in Example 1-1, a leuA mutant library was prepared using an error-prone PCR kit (clontech Diversify® PCR Random Mutagenesis Kit). A PCR reaction was performed using primers of SEQ ID NO: 3 and SEQ ID NO: 4 described in Table 1 under conditions where 0 to 3 mutations occur per 1000 bp.

In detail, PCR was performed by pre-heating at 94° C. for 30 seconds. followed by 25 cycles of denaturation at 94° C. for 30 seconds, and polymerization at 68° C. for 1 minute 30 seconds. The PCR product obtained at this time was subjected to 25 cycles of denaturation at 95° C. for 50 seconds, annealing at 60° C. for 50 seconds, and polymerization at 68° C. for 12 minutes using megaprimer (50 ng to 125 ng), followed by Dpnl treatment, and then transformed into E. col DH5a by a heat shock method, and plated on LB solid medium containing 25 mg/L of kanamycin. After selecting 20 types of transformed colonies. plasmids were obtained and sequenced. As a result, it was confirmed that mutations were introduced at different positions with a frequency of 2 mutations/kb. About 20,000 transformed *E. coli* colonies were taken and plasmids were extracted, which was named 'pTOPO-leuA-library'.

Example 2. Evaluation of Constructed Library and Selection of Mutants 2-1. Selection of Mutant Strains with Increased L-Leucine Production The pTOPO-leuA-library prepared in Example 1-2 was transformed into the wild-type *Corynebacterium glutamicum* ATCC13032 by electroporation, and then spread on a nutrient medium (Table 2) containing 25 mg/L kanamycin to select 10,000 colonies of the strain into which mutant genes were inserted. Each selected colony was named ATCC13032/pTOPO_euA (mt) 1 to ATCC13032/pTOPO_leuA (mt) 10,000.

In order to identify colonies, in which production of L-leucine increased and production of L-phenylalanine among aromatic amino acids increased or decreased, among the obtained 10,000 colonies, fermentation titer was evaluated for each colony by the following method.

TABLE 2

| Type of medium | Ingredient |
| --- | --- |
| Production medium | 100 g of glucose, 40 g of (NH$_4$)$_2$SO$_4$, 2.5 g of soy protein, 5 g of corn steep solids, 3 g of urea, 1 g of KH$_2$PO$_4$, 0.5 g of MgSO$_4$•7H$_2$O, 100 μg of biotin, 1,000 μg of thiamine hydrochloride, 2000 μg of calcium-pantothenic acid, 3,000 μg of nicotinamide, 30 g of CaCO$_3$; (Based on 1 liter of distilled water), pH 7.0 |
| Nutrient medium | 10 g of glucose, 5 g of beef extract, 10 g of polypeptone, 2.5 g of sodium chloride, 5 g of yeast extract, 20 g of agar, 2 g of urea (based on 1 liter of distilled water) |

Each colony was inoculated using a platinum loop into a 250 ml corner-baffle flask containing 25 ug/ml of kanamycin in 25 ml of a production medium of Table 2, and then cultured at 30° C. for 60 hours under shaking at 200 rpm. After completion of the culture, L-leucine production was measured by a method of using high-performance liquid chromatography (HPLC, SHIMAZDU LC20A).

As a result, among 10.000 colonies, 5 kinds of strains (ATCC13032/pTOPO_leuA(mt)3847, ATCC13032/pTOPO_leuA(mt)4708, ATCC13032/pTOPO_leuA(mt)5109, ATCC13032/pTOPO_leuA(mt)7563, ATCC13032/pTOPO_leuA(mt)8459) showing the most improved L-leucine-producing ability, as compared to the wild-type *Corynebacterium glutamicum* ATCC13032, were selected. The concentrations of L-leucine produced in the selected strains are shown in Table 3 below.

TABLE 3

| Name of strain | L-leucine (g/L) |
| --- | --- |
| ATCC13032 | 0.87 |
| ATCC13032/pTOPO_leuA(mt)3847 | 1.23 |
| ATCC13032/pTOPO_leuA(mt)4708 | 1.27 |
| ATCC13032/pTOPO_leuA(mt)5109 | 1.39 |
| ATCC13032/pTOPO_leuA(mt)7563 | 1.19 |
| ATCC13032/pTOPO_leuA(mt)8459 | 1.25 |

As shown in Table 3, it was confirmed that *Corynebacterium glutamicum* ATCC13032/pTOPO_leuA(mt)3847 having a mutation in the leuA gene showed about 1.41-fold improvement in the L-leucine production, as compared to the parent strain, *Corynebacterium glutamicum* ATCC13032. It was also confirmed that ATCC13032/pTOPO_leuA(mt)4708, ATCC13032/pTOPO_leuA(mt)5109, ATCC13032/pTOPO_leuA(mt)7563, and ATCC13032/pTOPO_leuA(mt)8459 showed about 1.45-, 1.59-, 1.36-, and 1.38-fold improvement in the L-leucine production, as compared to the parent strain, respectively.

2-2. Identification of Mutations in Mutant Strains with Increased L-Leucine Production In order to identify the leuA gene mutation of the selected 5 mutant strains, PCR was performed using DNA of each mutant strain as a template and primers of SEQ ID NO: 3 and SEQ ID NO: 4 described in Table 1 under conditions of denaturation at 94° C. for 5 minutes, followed by 30 cycles of denaturation at 94° C. for 30 seconds, annealing at 55° C. for 30 seconds, and polymerization at 72° C. for 1 minute and 30 seconds, and then polymerization at 72° C. for 5 minutes, and DNA sequencing was performed.

As a result of sequencing, in the ATCC13032/pTOPO_leuA(mt)3847 strain, both C and T at positions 412 and 413 of the leuA gene of SEQ ID NO: 2 were substituted with G, indicating that it encodes a variant (hereinafter, referred to as L138G) having a substitution of glycine for leucine, which is the amino acid at position 138 (at position 103 based on a literature, in which the translation start codon is read 35 backwards and the LeuA protein consists of 581 amino acids (SEQ ID NO: 5); hereinafter, referred to as only at position 138) of LeuA protein. The amino acid sequence of the LeuA variant (L138G) and the nucleotide sequence of the leuA variant encoding the same are as in SEQ ID NO: 6 and SEQ ID NO: 7.

It was confirmed that the ATCC13032/pTOPO_leuA(mt) 4708 strain had a substitution of G for C, which are nucleotides at positions 484 and 486 of the leuA gene, indicating that it encodes a variant (hereinafter, referred to as H162E) having a substitution of glutamate for histidine, which is the amino acid at position 162 (at position 127 based on a literature, in which the translation start codon is read 35 backwards and the LeuA protein consists of 581 amino acids (SEQ ID NO: 5): hereinafter, referred to as only at position 162) of LeuA protein. The amino acid sequence of the LeuA variant (H162E) and the base sequence of the leuA variant encoding the same are as in SEQ ID NO: 8 and SEQ ID NO: 9.

It was confirmed that the ATCC13032/pTOPO_leuA(mt) 5109 strain had a substitution of CTT for TCC, which are nucleotides at positions 631 to 633 of the leuA gene, indicating that it encodes a variant (hereinafter, referred to as S211L) having a substitution of leucine for serine, which is the amino acid at position 211 (at position 176 based on a literature, in which the translation start codon is read 35 backwards and the LeuA protein consists of 581 amino acids (SEQ ID NO: 5); hereinafter, referred to as only at position 211) of LeuA protein. The amino acid sequence of the LeuA variant (S211L) and the nucleotide sequence of the leuA variant encoding the same are as in SEQ ID NO: 10 and SEQ ID NO: 11.

It was confirmed that the ATCC13032/pTOPO_leuA(mt) 7563 strain had a substitution of CC for AT, which are nucleotides at positions 1762 to 1763 of the leuA gene, indicating that it encodes a variant (hereinafter, referred to as 1588P) having a substitution of proline for isoleucine, which is the amino acid at position 588 (at position 553 based on a literature, in which the translation start codon is read 35 backwards and the LeuA protein consists of 581 amino acids (SEQ ID NO: 5); hereinafter, referred to as only at position 553) of LeuA protein. The amino acid sequence of the LeuA variant (1588P) and the nucleotide sequence of the leuA variant encoding the same are as in SEQ ID NO: 12 and SEQ ID NO: 13.

It was also confirmed that the ATCC13032/pTOPO_leuA (mt)8459 strain had a substitution of TC for AA, which are nucleotides at positions 733 to 734 of the leuA gene, indicating that it encodes a variant (hereinafter, referred to as N245S) having a substitution of serine for asparagine, which is the amino acid at position 245 (at position 210 based on a literature, in which the translation start codon is read 35 backwards and the LeuA protein consists of 581 amino acids (SEQ ID NO: 5): hereinafter, referred to as only at position 245) of LeuA protein. The amino acid sequence of the LeuA variant (N245S) and the nucleotide sequence of the leuA variant encoding the same are as in SEQ ID NO: 14 and SEQ ID NO: 15.

In the following Examples, it was examined whether the variations (L138G, H162E, S211L, N245S. 1588P) affect the L-leucine production of the microorganisms of the genus *Corynebacterium*.

Example 3. Examination of L-Leucine-Producing Ability of Selected Mutant Strains 3-1. Construction of Insertion Vector Including leuA Variation In order to introduce the variations selected in Example 2 into the strain, it was intended to construct an insertion vector. A site directed mutagenesis was used to construct a vector for introducing leuA (L138G, H162E, S211L, N245S, 1588P) variations. In detail, PCR was performed using the chromosome of the wild-type *Corynebacterium glutamicum* ATCC13032 strain as a template, and using a primer pair of SEQ ID NO: 16 and SEQ ID NO: 17, a primer pair of SEQ ID NO: 18 and SEQ ID NO: 19 for generating the L138G variation, and using a primer pair of SEQ ID NO: 16 and SEQ ID NO: 20, and a primer pair of SEQ ID NO: 19 and SEQ ID NO: 21 for generating the H162E variation. PCR was performed using a primer pair of SEQ ID NO: 16 and SEQ ID NO: 22, a primer pair of SEQ ID NO: 19 and SEQ ID NO: 23 for generating the S211L variation, and using a primer pair of SEQ ID NO: 16 and SEQ ID NO: 24, a primer pair of SEQ ID NO: 19 and SEQ ID NO: 25 for generating the N245S variation. PCR was performed using a primer pair of SEQ ID NO: 16 and SEQ ID NO: 26, a primer pair of SEQ ID NO: 19 and SEQ ID NO: 27 for generating the 1588P variation. In detail, PCR was performed by denaturation at 94° C. for 5 minutes, followed by 30 cycles consisting of denaturation at 94° C. for 30 seconds, annealing at 55° C. for 30 seconds, and polymerization at 72° C. for 1 minute and 30 seconds, and then polymerization at 72° C. for 5 minutes. Specific sequences of the used primers are shown in Table 4 below.

TABLE 4

| SEQ ID NO. | Sequence name | Sequence (5'->3') |
|---|---|---|
| SEQ ID NO: 16 | Primer 3 | GGTCGACTCTAGAGGATCCCCTATGCTTCACCACATGACTTC |
| SEQ ID NO: 17 | Primer 4 | CAGGTGCTCACGAGCCTGAACCccAACCTGAATGGTGACATC |
| SEQ ID NO: 18 | Primer 5 | GACGATGTCACCATTCAGGTTggGGTTCAGGCTCGTGAG |
| SEQ ID NO: 19 | Primer 6 | GTGAATTCGAGCTCGGTACCCAAATCATTTGAGAAAACTCGAGGC |
| SEQ ID NO: 20 | Primer 7 | GATGGAGGTTGAGTTGTAGAAcTcCACGATAACGTTTTTTGCG |
| SEQ ID NO: 21 | Primer 8 | GGCGCAAAAAACGTTATCGTGgAgTTCTACAACTCAACCTCC |
| SEQ ID NO: 22 | Primer 9 | AGTGCCGGTGAAGGACTCAGGaagGTACTGCCAGCGCC |
| SEQ ID NO: 23 | Primer 10 | ACCAACTGGCGCTGGCAGTACcttCCTGAGTCCTTCACC |
| SEQ ID NO: 24 | Primer 11 | CATCTCAACGGTGGAACACAGGgaGATGATCATTGGGTTCTC |
| SEQ ID NO: 25 | Primer 12 | CCTGAGAACCCAATGATCATCtcCCTGTGTTCCACCG |
| SEQ ID NO: 26 | Primer 13 | TGCCTTCAGCGAAGCGTAGGTGggGGAGCCAGCGATGC |
| SEQ ID NO: 27 | Primer 14 | GGCGTCGGCATCGCTGGCTCCccCACCTACGCTTCGCTG |

Cloning was performed by fusing the PCR product with a linear pDCM2 vector digested with SmaI restriction enzyme, using In-Fusion enzyme through the homologous sequence of the terminal 15 bases between the DNA fragments, thereby constructing 'pDCM2-leuA(L138G)', 'pDCM2-leuA(H162E)', 'pDCM2-leuA(S211L)', 'pDCM2-leuA(N245S)', and 'pDCM2-leuA(I588P)' which are vectors for substituting the amino acids of LeuA. Further, 'pDCM2-leuA(S211L, 1588P), pDCM2-leuA(L138G, H162E, S211L, N245S)', 'pDCM2-leuA(L138G, H162E, S211L, N245S, 1588P)', which are vectors for substituting the amino acids of LeuA, were constructed according to combination of the variants.

3-2. Introduction of Variant into *Corynebacterium glutamicum* ATCC13032 Strain and Evaluation pDCM2-leuA(L138G), pDCM2-leuA(H162E), pDCM2-leuA(S211L). pDCM2-leuA(N245S), pDCM2-leuA (1588P), pDCM2-leuA(S211L, 1588P), pDCM2-leuA (L138G, H162E, S211L, N245S), pDCM2-leuA(L138G, H162E, S211L, N245S, 1588P) vectors prepared in Example 3-1 were transformed into *Corynebacterium glutamicum* ATCC13032 strain by electroporation, respectively and the strains, in which each vector was inserted on the chromosome by recombination of the homologous sequence, were selected in a medium containing 25 mg/L of kanamycin. The selected primary strains were again subjected to secondary crossover, and strains into which the target gene variation was introduced were selected. Finally, whether or not the leuA gene variation was introduced into the transformed strain was confirmed by performing PCR using primers of SEQ ID NO: 3 and SEQ ID NO: 4, and then analyzing the nucleotide sequence, thereby identifying that the variation was introduced into the strain. A total of 8 strains were prepared, and named 'ATCC13032_leuA_L138G', 'ATCC13032_leuA_H162E'. 'ATCC13032_leuA_S211L', 'ATCC13032_leuA_N245S', 'ATCC13032_leuA_1588P', 'ATCC13032_leuA_(S211L, 1588P)''ATCC13032_leuA_ (L138G, H162E, S211 L, N245S)', 'ATCC13032_leuA_ (L138G, H162E, S211L, N245S, 1588P)', respectively.

In order to evaluate L-leucine-producing ability of a total of 8 strains thus prepared, a flask fermentation titer was evaluated. Each one platinum loop of the parent strain *Corynebacterium glutamicum* ATCC13032 and the prepared ATCC13032_leuA_L138G, ATCC13032_leuA_H162E, ATCC13032_leuA_S211 L, ATCC13032_leuA_N245S, ATCC13032_leuA_1588P, ATCC13032_leuA (S211L, 1588P), ATCC13032_leuA_(L138G, H162E, S211L, N245S), ATCC13032_leuA_(L138G, H162E, S211L, N245S, 1588P) was inoculated into a 250 ml corner-baffle flask containing 25 ml of a production medium, and then cultured at 30° C. for 60 hours under shaking at 200 rpm to produce L-leucine. After completion of the culture, L-leucine production was measured by HPLC. The concentration of leucine in the culture medium of each tested strain is shown in Table 5 below.

TABLE 5

| Name of strain | Leucine (g/L) |
| --- | --- |
| ATCC13032 | 0.87 |
| ATCC13032_leuA_L138G | 1.27 |
| ATCC13032_leuA_H162E | 1.30 |
| ATCC13032_leuA_S211L | 1.38 |
| ATCC13032_leuA_N245S | 1.22 |
| ATCC13032_leuA_I588P | 1.20 |
| ATCC13032_leuA_(S211L, I588P) | 1.32 |
| ATCC13032_leuA_(L138G, H162E, S211L, N245S) | 1.36 |
| ATCC13032_leuA_(L138G, H162E, S211L, N245S, I588P) | 1.35 |

As shown in Table 5, ATCC13032_leuA_L138G with L138G variation in the leuA gene showed about 1.45-fold improvement in the L-leucine yield, as compared to the parent strain *Corynebacterium glutamicum* ATCC13032, ATCC13032_leuA_H162E with H162E variation showed about 1.49-fold improvement in the L-leucine yield, as compared to the parent strain *Corynebacterium glutamicum* ATCC13032, ATCC13032_leuA_S211L with S211L variation showed about 1.58-fold improvement in the L-leucine yield, as compared to the parent strain *Corynebacterium glutamicum* ATCC13032, ATCC13032_leuA_N245S with N245S variation showed about 1.40-fold improvement in the L-leucine yield, as compared to the parent strain *Corynebacterium glutamicum* ATCC13032, ATCC13032_leuA_1588P with 1588P variation showed about 1.37-fold improvement in the L-leucine yield, as compared to the parent strain *Corynebacterium glutamicum* ATCC13032, and ATCC13032_leuA_(S211L, 1588P) showed about 1.51-fold improvement in the L-leucine yield, as compared to the parent strain. ATCC13032_leuA_ (L138G, H162E, S211L, N245S) and ATCC13032_leuA_ (L138G, H162E, S211L, N245S, 1588P) showed about 1.56-fold improvement in the L-leucine yield, as compared to the parent strain *Corynebacterium glutamicum*.

Example 4. Examination of Leucine-Producing Ability of Selected leuA Variations in Leucine-Producing Strains The wild-type strain of the genus *Corynebacterium* produces only trace amounts of leucine even though it produces leucine. Accordingly, a leucine-producing strain derived from the wild-type *Corynebacterium glutamicum* ATCC13032 was prepared, and the selected variations were introduced to perform an experiment for examining the leucine-producing ability. The detailed experimental method and results are as follows.

4-1. Preparation of L-Leucine-Producing CJL-8109 Strain

As strains for producing high concentrations of L-leucine, the wild-type *Corynebacterium glutamicum* ATCC13032-derived strains were prepared, each including (1) a variation (R558H), in which histidine was substituted for arginine which is an amino acid at position 558 of LeuA protein by substituting A for G which is a nucleotide at position 1673 of leuA gene, (2) a variation (G561D), in which aspartic acid was substituted for glycine which is an amino acid at position 561 of LeuA protein by substituting AT for GC which are nucleotides at positions 1682 and 1683 of leuA gene, or (3) variation (P247C), in which cysteine was substituted for proline which is an amino acid at position 247 of LeuA protein by substituting TG for CC which are nucleotides at positions 739 and 740 of leuA gene.

In detail, pDCM2-leuA(R558H, G561D) vector (US Patent Publication NO. 2021-0254111) including the leuA gene variations (R558H. G561D) was transformed into *Corynebacterium glutamicum* ATCC13032 by electroporation. and strains in which the vector was inserted on the chromosome by recombination of homologous sequence were selected in a medium containing 25 mg/L kanamycin. The selected primary strains were again subjected to secondary crossover, and strains into which the leuA gene variation was introduced were selected. Finally, whether or not the variation was introduced into the transformed strain was confirmed by performing PCR (94° C. for 5 minutes, followed by 30 cycles of 94° C. for 30 seconds/55° C. for 30 seconds/72° C. for 90 seconds, and 72° C. for 5 minutes) using primers of SEQ ID NOS. 28 and 55, and then analyzing the nucleotide sequence, thereby identifying introduction of R558H, G561D variations. Specific sequences of the used primers are shown in Table 6 below. ATCC13032_leuA_(R558H, G561D) strain transformed with the pDCM2-leuA(R558H, G561D) vector was named 'CJL-8100'.

TABLE 6

| SEQ ID NO. | Sequence name | Sequence (5'->3') |
|---|---|---|
| SEQ ID NO: 28 | Primer 15 | AACACGACCGGCATCCCGTCGC |
| SEQ ID NO: 29 | Primer 16 | AAATCATTTGAGAAAACTCGAGG |
| SEQ ID NO: 19 | Primer 6 | GTGAATTCGAGCTCGGTACCCAAATCATTTGAGAAAACTCGAGGC |
| SEQ ID NO: 54 | Primer 27 | GGTGATCATCTCAACGGTGGAACACAGGTTGATGATCATTGGGTT |
| SEQ ID NO: 55 | Primer 28 | AACCCAATGATCATCAACCTGTGTTCCACCGTTGAGATGATCACC |

To introduce the variation (P247C) into the L-leucine-producing strain, CJL-8100, an insertion vector was constructed.

In detail, PCR was performed using the chromosome of CJL-8100 strain as a template and primer pairs of SEQ ID NOS: 28 and 29 and SEQ ID NOS: 54 and 55. PCR was performed as follows: denaturation at 94° C. for 5 minutes, 30 cycles of at 94° C. for 30 seconds, at 55° C. for 30 seconds, and at 72° C. for 1 minute 30 seconds, followed by polymerization at 72° C. for 5 minutes. The resulting PCR product was cloned into a linear pDCM2 vector digested with SmaI restriction enzyme using In-Fusion enzyme through fusion of the homologous sequence of the terminal 15 bases between DNA fragments, thereby constructing a pDCM2-leuA(P247C, R558H, G561D) vector including the leuA variation encoding the LeuA variant, in which histidine was substituted for arginine which is an amino acid at position 558 of the LeuA amino acid sequence of the wild-type strain, and aspartic acid was substituted for glycine which is an amino acid at position 561 thereof, and cysteine (Cys) was substituted for proline(Pro) which is an amino acid at position 247 of LeuA.

The pDCM2-leuA(P247C, R558H, G561D) vector was transformed into the wild-type Corynebacterium glutamicum ATCC13032 by electroporation, and strains in which the vector was inserted on the chromosome by recombination of homologous sequence were selected in a medium containing 25 mg/L kanamycin. The selected primary strains were again subjected to secondary crossover, and strains into which the leuA gene variations were introduced were selected. Finally, whether or not the variations were introduced into the transformed strain was confirmed by performing PCR (94° C. for 5 minutes, 30 cycles of denaturation at 94° C. for 30 seconds, annealing at 55° C. for 30 seconds, and polymerization at 72° C. 90 seconds, followed by polymerization at 72° C. for 5 minutes) using primers of SEQ ID NOS: 3 and 4, and then analyzing the nucleotide sequence, thereby identifying introduction of P247C, R558H, and G561D variations. The ATCC13032_leuA_ (P247C, R558H, G561D) strain transformed with the pDCM2-leuA(P247C, R558H, G561D) vector was named 'CA13-8105'.

CA13-8105 was deposited at the Korean Culture Center of Microorganisms, an international depositary authority under the Budapest Treaty, on Apr. 29, 2020, and assigned Accession No. KCCM12709P.

To increase the L-leucine productivity in the prepared CA13-8105 strain, a strain into which ilvE variant(V156A) encoding branched-chain amino acid aminotransferase was introduced was prepared (WO WO2021-112469 A1). In detail, the pDCM2-ilvE(V156A) vector including the ilvE gene variation was transformed into Corynebacterium glutamicum CJL-8100 by electroporation, and strains in which the vector was inserted on the chromosome by recombination of homologous sequence were selected in a medium containing 25 mg/L kanamycin. The selected primary strains were again subjected to secondary crossover, and strains into which the ilvE gene variation was introduced were selected. Finally, whether or not the variation was introduced into the transformed strain was confirmed by performing PCR (94° C. for 5 minutes, 30 cycles of 94° C. 30 seconds/55° C. 30 seconds/72° C. 90 seconds, followed by 72° C. for 5 minutes) using primers of SEQ ID NOS: 30 and 31 of Table 7 below, and then analyzing the nucleotide sequence, thereby identifying introduction of V156A variation. The strain transformed with the pDCM2-ilvE(V156A) vector was named 'CJL-8108'.

TABLE 7

| SEQ ID NO. | Sequence name | Sequence (5'->3') |
|---|---|---|
| SEQ ID NO: 30 | Primer 23 | GTCACCCGATCGTCTGAAG |
| SEQ ID NO: 31 | Primer 24 | GTCTTAAAACCGGTTGAT |

To increase the L-leucine productivity in the prepared CJL-8108 strain, a strain into which gltA variant(M3121) with weakened citrate synthase activity was introduced was prepared.

In detail, site directed mutagenesis was used in the construction of a vector for introducing the gltA(M3121) variation. PCR was performed using the chromosome of the wild-type Corynebacterium glutamicum ATCC13032 as a template and primers of Table 8 below. PCR was performed under conditions of denaturation at 94° C. for 5 minutes, 30 cycles of at 94° C. for 30 seconds, at 55° C. for 30 seconds, and at 72° C. for 1 minute and 30 seconds, followed by polymerization at 72° C. for 5 minutes. The resulting gene fragment was cloned into a linear pDCM2 vector digested with SmaI restriction enzyme using In-Fusion enzyme through fusion of the homologous sequence of the terminal 15 bases between DNA fragments, thereby constructing a pDCM2-gltA(M3121) vector for substituting methionine at position 312 with isoleucine.

TABLE 8

| SEQ ID NO. | Sequence name | Sequence (5'->3') |
|---|---|---|
| 32 | gltA M312I Up F | GTGAATTCGAGCTCGGTACCCGCGGGAATCCTGCGTTACCGC |
| 33 | gltA M312I Up R | TGTAAACGCGGTGTCCGAAGCCGATGAGGCGGACGCCGTCTT |

TABLE 8-continued

| SEQ ID NO. | Sequence name | Sequence (5'->3') |
|---|---|---|
| 34 | gltA M312I Down F | AAGACGGCGTCCGCCTCATCGGCTTCGGACACCGCGTTTACA |
| 35 | gltA M312I Down R | GGTCGACTCTAGAGGATCCCCTTAGCGCTCCTCGCGAGGAAC |

The pDCM2-gltA(M312I) vector including the gltA gene variation was transformed into *Corynebacterium glutamicum* CJL-8108 by electroporation, and strains in which the vector was inserted on the chromosome by recombination of homologous sequence were selected in a medium containing 25 mg/L kanamycin. The selected primary strains were again subjected to secondary crossover, and strains into which the gltA gene variation was introduced were selected. Finally, whether or not the variation was introduced into the transformed strain was confirmed by performing PCR (94° C. for 5 minutes, 30 cycles of 94° C. 30 seconds/55° C. 30 seconds/72° C. 90 seconds, followed by 72° C. for 5 minutes) using primers of SEQ ID NOS: 36 and 37 of Table 9 below, and then analyzing the nucleotide sequence, thereby identifying introduction of M312I variation. The strain transformed with the pDCM2-gltA(M312I) vector was named 'CJL-8109'.

TABLE 9

| SEQ ID NO. | Sequence name | Sequence (5'->3') |
|---|---|---|
| SEQ ID NO: 36 | Primer 25 | CAATGCTGGCTGCGTACGC |
| SEQ ID NO: 37 | Primer 26 | CTCCTCGCGAGGAACCAACT |

4-2. Construction of Insertion Vector Including leuA Variation

In order to introduce the variations (L138G. H162E, S211L, N245S, I588P) selected in Example 2 into the L-leucine producing strain CJL-8109 prepared in Example 4-1, it was intended to construct an insertion vector.

PCR was performed using the chromosome of the CJL-8109 strain as a template, and a primer pair of Table 4. PCR was performed under conditions of denaturation at 94° C. for 5 minutes, 30 cycles of denaturation at 94° C. for 30 seconds, annealing at 55° C. for 30 seconds, and polymerization at 72° C. for 1 minute and 30 seconds, followed by polymerization at 72° C. for 5 minutes. The resulting PCR product was cloned into a linear pDCM2 vector digested with SmaI restriction enzyme using In-Fusion enzyme through fusion of the homologous sequence of the terminal 15 bases between DNA fragments, thereby constructing a total of 8 vectors, 'pDCM2-leuA(L138G, P247C, R558H, G561D)', 'pDCM2-leuA(H162E, P247C, R558H, G561D)', 'pDCM2-leuA(S211L, P247C, R558H, G561D)', 'pDCM2-leuA(N245S, P247C, R558H, G561D)', 'pDCM2-leuA (P247C, R558H, G561D, I588P)', 'pDCM2-leuA(S211L. P247C, I588P)', 'pDCM2-leuA(L138G, H162E, S211L, N245S, P247C, R558H, G561D)', and 'pDCM2-leuA (L138G, H162E, S211L, N245S, P247C, R558H, G561D, I588P)'.

4-3. Introduction of leuA Variant into CJL-8109 Strain and Evaluation

The L-leucine producing strain CJL-8109 was transformed with each of the vectors prepared in Example 4-2, and the strains, in which each vector was inserted on the chromosome by recombination of the homologous sequence, were selected in a medium containing 25 mg/L of kanamycin. The selected primary strains were again subjected to secondary crossover, and strains into which the target gene variation was introduced were selected. Finally, whether or not the leuA gene variation was introduced into the transformed strain was confirmed by performing PCR using primers of SEQ ID NO: 3 and SEQ ID NO: 4, and then analyzing the nucleotide sequence, thereby identifying that the leuA variation was introduced into the strain. A total of 8 strains thus prepared were named as in Table 11 below, and the amino acid sequence of the variant including the variation and the nucleotide sequence of the leuA variant encoding the same are shown in Table 10 below.

TABLE 10

| Name of strain | No. of strain | SEQ ID NO. |
|---|---|---|
| CJL-8109_leuA_L138G, P247C, R558H, G561D | CJL-8117 | SEQ ID NO: 38, 39 |
| CJL-8109_leuA_H162E, P247C, R558H, G561D | CJL-8118 | SEQ ID NO: 40, 41 |
| CJL-8109_leuA_S211L, P247C, R558H, G561D | CA13-8119 | SEQ ID NO: 42, 43 |
| CJL-8109_leuA_N245S, P247C, R558H, G561D | CJL-8120 | SEQ ID NO: 44, 45 |
| CJL-8109_leuA_I588P, P247C, R558H, G561D | CJL-8121 | SEQ ID NO: 46, 47 |
| CJL-8109_leuA_S211L, P247C, R558H, G561D, I588P | CJL-8122 | SEQ ID NO: 48, 49 |
| CJL-8109_leuA_L138G, H162E, S211L, N245S, P247C, R558H, G561D | CJL-8123 | SEQ ID NO: 50, 51 |
| CJL-8109_leuA_L138G, H162E, S211L, N245S, P247C, R558H, G561D, I588P | CJL-8125 | SEQ ID NO: 52, 53 |

Thereafter, L-leucine producing ability of the wild-type *Corynebacterium glutamicum* ATCC13032, the prepared CJL-8109, CJL-8117, CJL-8118, CA13-8119, CJL-8120, CJL-8121. CJL-8122, CJL-8123, and CJL-8125 strains was evaluated. In detail, a flask culture was performed by the method of Example 2-1. After completion of the culture, L-leucine productions of the parent strain and the variant strains were measured by HPLC, and the results are shown in Table 11 below.

TABLE 11

| Name of strain | L-leucine (g/L) |
|---|---|
| ATCC13032 | 0.87 |
| CJL-8109 | 2.89 |
| CJL-8117 | 3.55 |
| CJL-8118 | 3.67 |
| CA13-8119 | 4.03 |
| CJL-8120 | 3.46 |
| CJL-8121 | 3.48 |
| CJL-8122 | 4.52 |
| CJL-8123 | 4.02 |
| CJL-8125 | 4.01 |

As shown in Table 11, CJL-8117, CJL-8118, CA13-8119, CJL-8120, CJL-8121, CJL-8122, CJL-8124, and CJL-8125 which are L-leucine producing strains having additional variation of L138G, H162E, S211L, N245S, I588P, S211L/

1588P, L138G/H162E/S211L/N245S, or L138G/H162E/ S211L/N245S/1588P in the leuA gene showed about 4- to 5-fold improvement in the L-leucine productivity, as compared to the parent strain, wild-type *Corynebacterium glutamicum* ATCC13032. It was also confirmed that the L-leucine producing strains, *Corynebacterium glutamicum* CJL-8117, CJL-8118, CA13-8119, CJL-8120, CJL-8121, CJL-8122, CJL-8123, and CJL-8125 showed about 1.2- to 1.6-fold improvement in the L-leucine productivity, as compared to the parent strain *Corynebacterium glutamicum* CJL-8109.

These results indicate that the amino acids at positions 138, 162, 211, 245, and 588 of the amino acid sequence of LeuA protein are important sites for the L-leucine productivity.

4-4. Measurement of Isopropylmalate Synthase Activity in LeuA Variant-Introduced Strain In order to measure the isopropylmalate synthase activity in CJL-8109 and CJL-8117, CJL-8118, CA13-8119, CJL-8120, CJL-8121, CJL-8122, CJL-8123, and CJL-8125 which are the L-leucine-producing strains prepared in Example 4-3, the experiment was performed in the following manner.

Each one platinum loop of the strains (CJL-8109, CJL-8117, CJL-8118, CA13-8119, CJL-8120, CJL-8121, CJL-8122, CJL-8123, CJL-8125) and the wild-type *Corynebacterium glutamicum* ATCC13032 was inoculated into a 250 ml corner-baffle flask containing 25 ml of a production medium of Table 2, and then cultured at 30° C. for 16 hours under shaking at 200 rpm. After completion of the culture, each culture medium was centrifuged and the supernatant was discarded. The pellet was washed and suspended with a lysis buffer, and disrupted. Protein quantification of the lysate was performed according to the Bradford assay, and the lysate containing 100 μg/ml of protein was used. At this time, absorbance change at 412 nm due to thionitrobenzoate (TNB) formed from DTNB (5,5'-dithiobis-(2-nitrobenzoic acid), Ellman's reagent) by reduction using the produced CoA was measured to determine the activity of isopropylmalate synthase enzyme. The results of measuring the activity of isopropylmalate synthase in each strain are shown in Table 12 below.

TABLE 12

| Strain | Relative activity of isopropylmalate synthase (%) |
|---|---|
| ATCC13032 | 100 |
| CJL-8109 | 118 |
| CJL-8117 | 121 |
| CJL-8118 | 125 |
| CA13-8119 | 138 |
| CJL-8120 | 122 |
| CJL-8121 | 130 |
| CJL-8122 | 132 |

TABLE 12-continued

| Strain | Relative activity of isopropylmalate synthase (%) |
|---|---|
| CJL-8123 | 135 |
| CJL-8125 | 136 |

Next, in order to examine the degree of release of the feedback inhibition of the enzyme by leucine, the activity of isopropylmalate synthase was determined by measuring CoA generated when the lysate containing 100 μg/ml of protein was used under the condition where 2 g/L of leucine was added. The results of measuring the activity of isopropylmalate synthase in each strain are shown in Table 13 below.

TABLE 13

| Strain | 0 g/l of leucine | 2 g/l of leucine |
|---|---|---|
| | Relative activity of isopropylmalate synthase (%) | |
| ATCC13032 | 100 | 36 |
| CJL-8109 | 100 | 83 |
| CJL-8117 | 100 | 83 |
| CJL-8118 | 100 | 83 |
| CA13-8119 | 100 | 93 |
| CJL-8120 | 100 | 85 |
| CJL-8121 | 100 | 88 |
| CJL-8122 | 100 | 92 |
| CJL-8123 | 100 | 90 |
| CJL-8125 | 100 | 91 |

As shown in Tables 12 and 13, CJL-8109 and CJL-8117, CJL-8118, CA13-8119, CJL-8120, CJL-8121, CJL-8122, CJL-8123, and CJL-8125 which are L-leucine producing strains transformed with the LeuA variant-expressing vector showed about 1.18- to 1.38-fold improvement in the activity of isopropylmalate synthase, as compared to the control wild-type *Corynebacterium glutamicum* ATCC 13032. It was also confirmed that the L-leucine producing strains maintained 83% to 93% of the isopropylmalate synthase activity even under condition where 2 g/L of leucine was added, indicating that feedback inhibition by leucine was released.

CA13-8119 was deposited at the Korean Culture Center of Microorganisms, an international depository authority under the Budapest Treaty, on Feb. 8, 2021, and assigned Accession No. KCCM12949P.

Based on the above description, it will be understood by those skilled in the art that the present disclosure may be implemented in a different specific form without changing the technical spirit or essential characteristics thereof. In this regard, it should be understood that the above embodiment is not limitative, but illustrative in all aspects. The scope of the disclosure is defined by the appended claims rather than by the description preceding them, and therefore all changes and modifications that fall within metes and bounds of the claims, or equivalents of such metes and bounds are therefore intended to be embraced by the claims.

The invention claimed is:

1. A polypeptide variant having an isopropylmalate synthase activity, comprising one or more substitutions selected from the group consisting of i) a substitution of an amino acid residue corresponding to position 138 with another amino acid residue, ii) a substitution of an amino acid residue corresponding to position 162 with another amino acid residue, iii) a substitution of an amino acid residue corresponding to position 211 with another amino acid residue, iv) a substitution of an amino acid residue corresponding to position 245 with another amino acid residue, and v) a substitution of an amino acid residue corresponding to position 588 with another amino acid residue, in the amino acid sequence of SEQ ID NO: 1.

2. The polypeptide variant of claim 1, wherein i) leucine, which is the amino acid residue corresponding to position 138, is substituted with glycine.

3. The polypeptide variant of claim 1, wherein ii) histidine, which is the amino acid residue corresponding to position 162, is substituted with glutamate.

4. The polypeptide variant of claim 1, wherein iii) serine, which is the amino acid residue corresponding to position 211, is substituted with leucine.

5. The polypeptide variant of claim 1, wherein iv) asparagine, which is the amino acid residue corresponding to position 245, is substituted with serine.

6. The polypeptide variant of claim 1, wherein v) isoleucine, which is the amino acid residue corresponding to position 588, is substituted with proline.

7. The polypeptide variant of claim 1, comprising any one or more amino acid sequences selected from the group consisting of SEQ ID NO: 6, SEQ ID NO: 8, SEQ ID NO: 10, SEQ ID NO: 12, and SEQ ID NO: 14.

8. A polynucleotide encoding the polypeptide variant of claim 1.

9. A vector comprising the polynucleotide of claim 8.

10. A microorganism of the genus *Corynebacterium* producing L-leucine, the microorganism comprising the polypeptide variant of claim 1; a polynucleotide encoding the same; or a vector including the same.

11. The microorganism of the genus *Corynebacterium* of claim 10, wherein the microorganism of the genus *Corynebacterium* is *Corynebacterium glutamicum*.

12. A method of producing L-leucine, the method comprising a step of culturing, in a medium, a microorganism of the genus *Corynebacterium* producing L-leucine, the microorganism comprising the polypeptide variant of claim 1; a polynucleotide encoding the same; or a vector including the same.

13. The method of claim 12, further comprising a step of recovering L-leucine from the medium or from the microorganism after the step of culturing.

14. A composition for producing L-leucine, the composition comprising a microorganism of genus *Corynebacterium* producing L-leucine, the microorganism comprising the polypeptide variant of claim 1, a polynucleotide encoding the same, or a vector including the same; or a medium in which the microorganism is cultured.

15. The polypeptide variant according to claim 1, comprising at least 80% sequence identity to SEQ ID NO: 1.

* * * * *